(12) United States Patent
Kanie

(10) Patent No.: US 7,031,975 B2
(45) Date of Patent: Apr. 18, 2006

(54) METHOD AND PROGRAM FOR CREATING PICTURE DATA, AND SYSTEM USING THE SAME

(75) Inventor: Homare Kanie, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 326 days.

(21) Appl. No.: 10/652,652

(22) Filed: Aug. 28, 2003

(65) Prior Publication Data
US 2004/0243630 A1  Dec. 2, 2004

(30) Foreign Application Priority Data
Jan. 31, 2003  (JP) .............................. 2003-025072

(51) Int. Cl.
*G06F 17/30* (2006.01)
(52) U.S. Cl. .................................. 707/102; 707/104.1
(58) Field of Classification Search ................ 707/100, 707/102, 101, 104.1; 709/203, 246; 715/513; 719/319, 329
See application file for complete search history.

(56) References Cited

U.S. PATENT DOCUMENTS

| | | | |
|---|---|---|---|
| 5,206,951 A | 4/1993 | Khoyi et al. ................. | 719/315 |
| 2002/0083068 A1* | 6/2002 | Quass et al. ................. | 707/100 |
| 2003/0007009 A1 | 1/2003 | Haley ......................... | 715/805 |
| 2003/0204557 A1 | 10/2003 | Mandal et al. ............... | 709/202 |
| 2003/0217195 A1 | 11/2003 | Mandal et al. ............... | 719/330 |
| 2004/0205294 A1 | 10/2004 | Nakayama et al. .......... | 711/114 |

FOREIGN PATENT DOCUMENTS

| | | |
|---|---|---|
| JP | 61-193232 A | 8/1986 |
| JP | A-10-333838 | 12/1998 |
| JP | A-2002-351703 | 12/2002 |

OTHER PUBLICATIONS

Randy Finch, Web Typesetting-Part 5:Forms, Aug. 1996, pp. 1-4.*
Khoral Research, Inc., Available GUI Items, 1997, pp. 1-14.*

* cited by examiner

*Primary Examiner*—Apu Mofiz
(74) *Attorney, Agent, or Firm*—Townsend and Townsend and Crew LLP

(57) ABSTRACT

There is provided a GUI capable of mitigating troublesomeness in work by a setter/operator for performing setting of a computer. In a picture data creation method for creating, by means of a computer, picture data necessary to display on a display unit a picture in which two or more items and input columns made to be correspondent with the individual items are provided, the input columns are provided for selecting setting values correspondent with the items from a plurality of setting value candidates which can be correspondent with the items and inputting the selected setting values, and the computer has a step of creating picture data necessary for causing the display unit to display a picture in which the mutually different setting value candidates are displayed as defaults in the individual input columns.

11 Claims, 33 Drawing Sheets

FIG. 3A

| SECONDARY LU CANDIDATE | DEFAULT FLAG |
|---|---|
| LU3 | 0 |
| LU4 | 0 |
| LU5 | 0 |
| LU6 | 0 |
| LU7 | 0 |

FIG. 3B

| SECONDARY LU CANDIDATE | DEFAULT FLAG |
|---|---|
| LU3 | 1 |
| LU4 | 0 |
| LU5 | 0 |
| LU6 | 0 |
| LU7 | 0 |

FIG. 3C

| SECONDARY LU CANDIDATE | DEFAULT FLAG |
|---|---|
| LU3 | 1 |
| LU4 | 1 |
| LU5 | 0 |
| LU6 | 0 |
| LU7 | 0 |

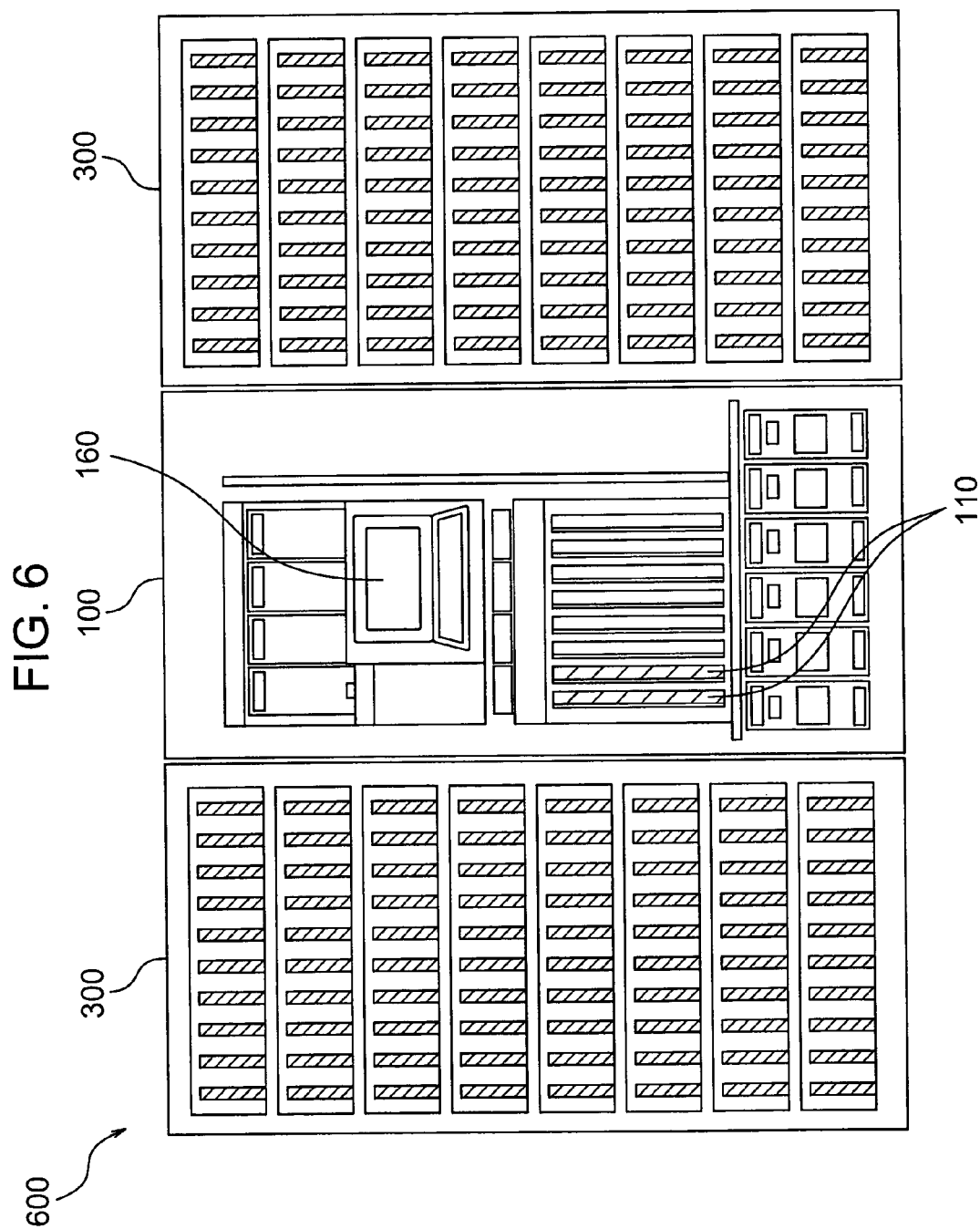

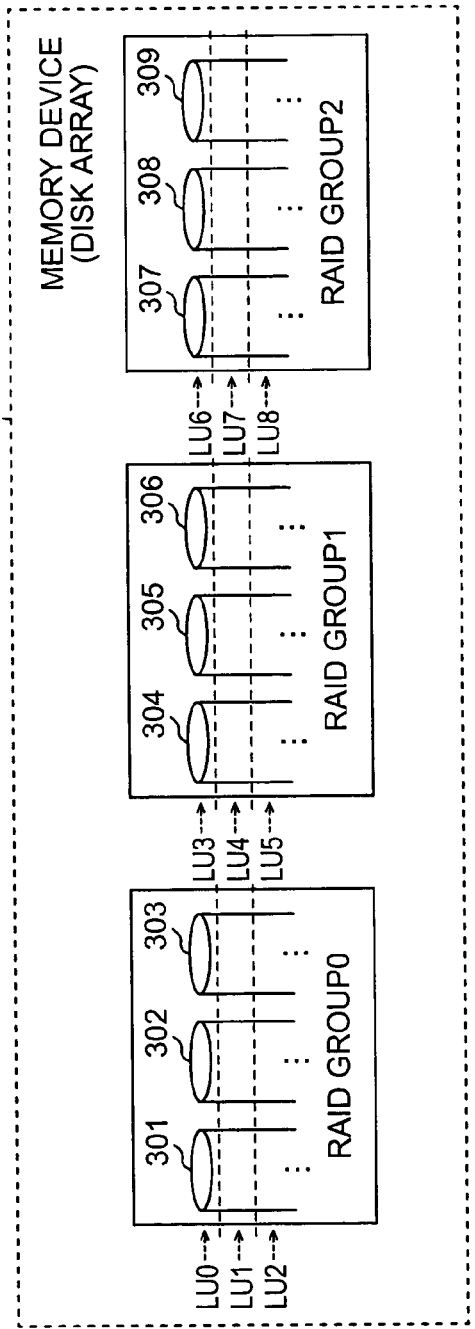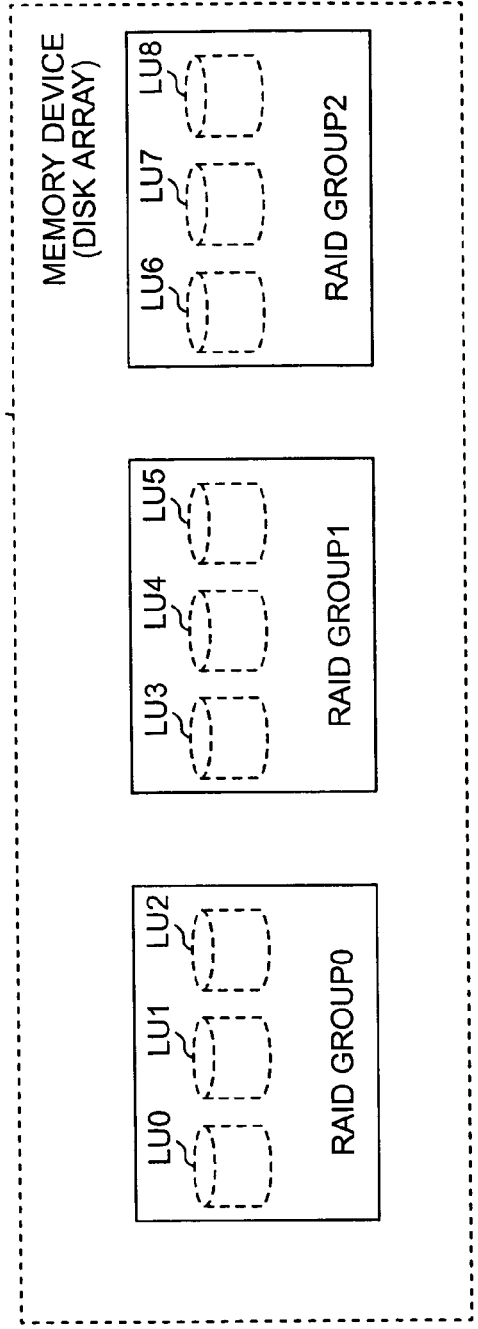

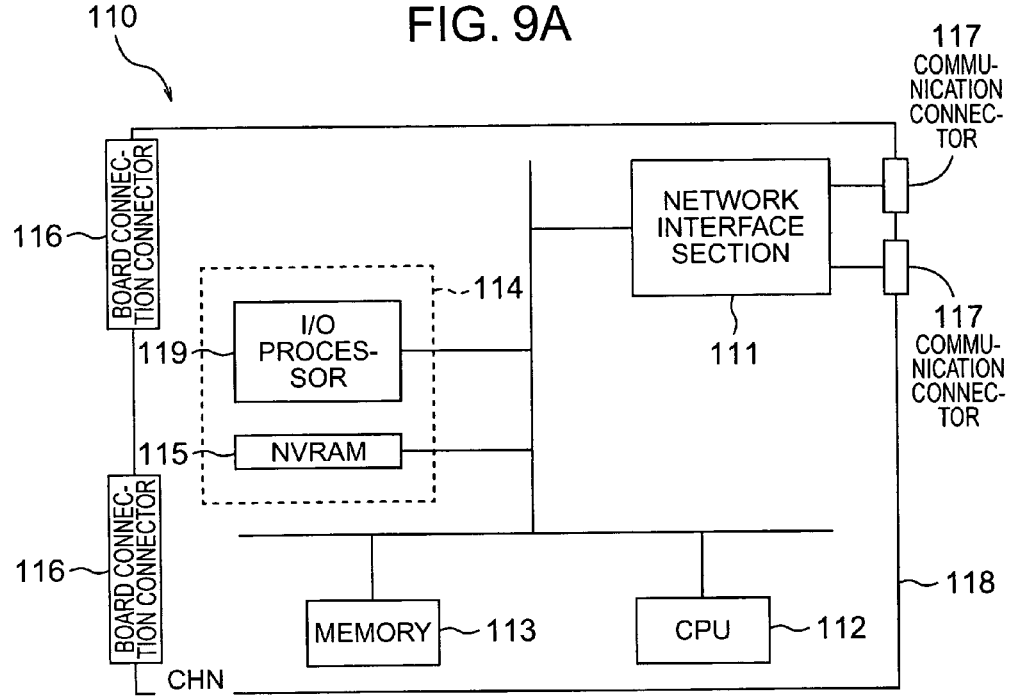
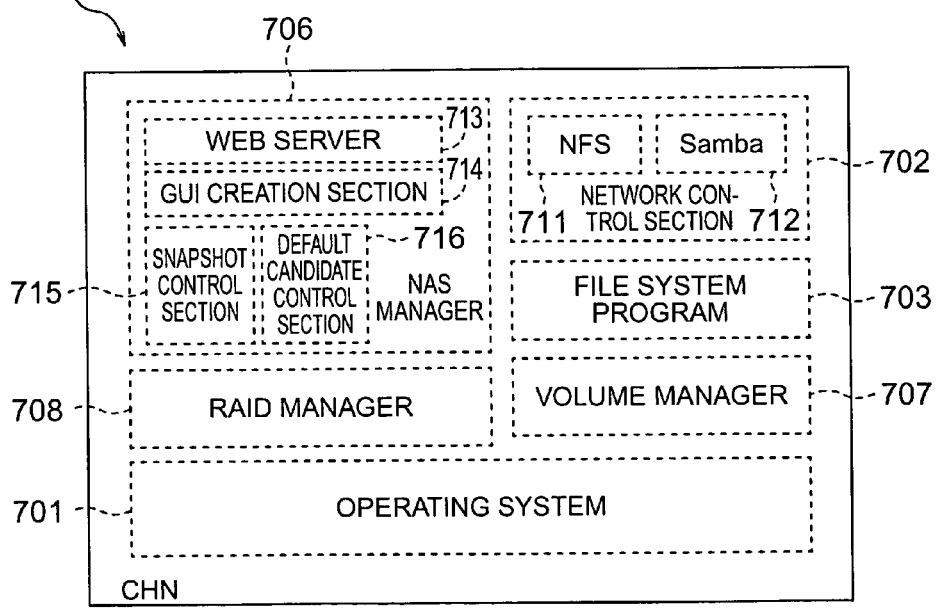

FIG. 10

LU MANAGEMENT TABLE

| LU NAME | EMULATION TYPE | CAPACITY | RAID GROUP | PHYSICAL DISK NUMBER | USE FLAG |
|---|---|---|---|---|---|
| LU0 | H-65xx-1 | 0.95GB | 0 | 301,302,303 | 1 |
| LU1 | H-65xx-1 | 0.95GB | 0 | 301,302,303 | 1 |
| LU2 | H-65xx-1 | 0.95GB | 0 | 301,302,303 | 0 |
| LU3 | H-65xx-1 | 0.95GB | 1 | 304,305,306 | 0 |
| LU4 | H-65xx-1 | 0.95GB | 1 | 304,305,306 | 0 |
| LU5 | H-65xx-1 | 0.95GB | 1 | 304,305,306 | 0 |
| LU6 | H-65xx-1 | 0.95GB | 2 | 307,308,309 | 0 |
| LU7 | H-65xx-1 | 0.95GB | 2 | 307,308,309 | 0 |
| LU8 | H-65xx-1 | 0.95GB | 2 | 307,308,309 | 0 |
| ... | ... | ... | ... | ... | ... |
| LU100 | H-65xx-3 | 2.92GB | 10 | 400,401 | 1 |
| LU101 | H-65xx-9 | 8.51GB | 11 | 402,403 | 1 |
| ... | ... | ... | ... | ... | ... |

FIG. 11

| VLU | LU |
|---|---|
| FS1 | LU0 |
|  | LU1 |
| FS2 | LU15 |
|  | LU16 |
|  | LU17 |
| ⋮ | ⋮ |

VIRTUAL LOGICAL VOLUME MANAGEMENT TABLE

FIG. 18

| OBJECT LU NAME | CORRESPOND-ING EMPTY LU |
|---|---|
| LU0 | LU2 |
| | LU3 |
| | LU4 |
| | LU5 |
| | LU6 |
| | LU7 |
| | LU8 |
| LU1 | LU2 |
| | LU3 |
| | LU4 |
| | LU5 |
| | LU6 |
| | LU7 |
| | LU8 |

EMPTY LU LIST

DEFAULT LU LIST

FIG. 21

| OBJECT LU NAME | CORRESPONDING EMPTY LU | DEFAULT FLAG |
|---|---|---|
| LU0 | LU2 | 1 |
| | LU3 | 0 |
| | LU4 | 0 |
| | LU5 | 0 |
| | LU6 | 0 |
| | LU7 | 0 |
| | LU8 | 0 |
| LU1 | LU2 | 0 |
| | LU3 | 0 |
| | LU4 | 0 |
| | LU5 | 0 |
| | LU6 | 0 |
| | LU7 | 0 |
| | LU8 | 0 |

DEFAULT LU LIST

DEFAULT LU LIST (APPLIED EXAMPLE 2)

| LU NAME | EMULATION TYPE | CAPACITY | RAID GROUP | PHYSICAL DISK NUMBER | USE FLAG | ACCESS SPEED | USE START DATE |
|---|---|---|---|---|---|---|---|
| LU0 | H-65xx-1 | 0.95GB | 0 | 301,302,303 | 1 | 1Mb/s | 2002/3/1 |
| LU1 | H-65xx-1 | 0.95GB | 0 | 301,302,303 | 1 | 1Mb/s | 2002/3/1 |
| LU2 | H-65xx-1 | 0.95GB | 0 | 301,302,303 | 0 | 1Mb/s | 2002/3/1 |
| LU3 | H-65xx-1 | 0.95GB | 1 | 304,305,306 | 0 | 5Mb/s | 2003/1/1 |
| LU4 | H-65xx-1 | 0.95GB | 1 | 304,305,306 | 0 | 5Mb/s | 2003/1/1 |
| LU5 | H-65xx-1 | 0.95GB | 1 | 304,305,306 | 0 | 5Mb/s | 2003/1/1 |
| LU6 | H-65xx-1 | 0.95GB | 2 | 307,308,309 | 0 | 10Mb/s | 2003/2/1 |
| LU7 | H-65xx-1 | 0.95GB | 2 | 307,308,309 | 0 | 10Mb/s | 2003/2/1 |
| LU8 | H-65xx-1 | 0.95GB | 2 | 307,308,309 | 0 | 10Mb/s | 2003/2/1 |
| . . . | . . . | . . . | . . . | . . . | . . . | . . . | . . . |
| LU100 | H-65xx-3 | 2.92GB | 10 | 400,401 | 1 | | 1999/5/1 |
| LU101 | H-65xx-9 | 8.51GB | 11 | 402,403 | 1 | | 1999/5/1 |
| . . . | . . . | . . . | . . . | . . . | . . . | . . . | . . . |

LU MANAGEMENT TABLE (APPLIED EXAMPLE 4)

EMPTY LU LIST (APPLIED EXAMPLE 4)

(APPLIED EXAMPLE 4)

(APPLIED EXAMPLE 4)

FIG. 33

| OBJECT LU NAME | CORRESPOND-ING EMPTY LU |
|---|---|
| LU0 | LU3 |
|  | LU4 |
|  | LU5 |
| LU1 | LU6 |
|  | LU7 |
|  | LU8 |

EMPTY LU LIST (APPLIED EXAMPLE 6)

METHOD AND PROGRAM FOR CREATING PICTURE DATA, AND SYSTEM USING THE SAME

BACKGROUND OF THE INVENTION

The present invention relates to a picture data creating method, computer and program.

In recent years, the amount of data to be handled by an information processing apparatus has been increasing rapidly. To cope with such circumstances, a storage system for storing and managing data externally of the information processing apparatus has been used widely and frequently. The storage system is provided with many disk drives (physical disks). Then, by managing and working these disk drives through, for example, RAID scheme, many logical volumes can be organized on the disk drives, thus providing logical storage areas for the information processing apparatus.

Also, a storage system called NAS (Network Attached Storage) has been developed in which a storage system and an information processing apparatus are connected mutually by using such a protocol as TCP/IP (Transmission Control Protocol/Internet Protocol) to realize access on file level from the information processing apparatus.

A technique is known in which data of a logical volume in a storage system is copied to another logical volume provided in the same storage system or in a different storage system in order to improve maintainability/anti-fault properties in the storage system as above (for example, see JP-A-10-333838). Further, a technique for copying data stored as file data in a storage system to a different storage system is also known (for example, see JP-A-2002-351703).

If there are many logical volumes and data of a particular one of them is to be copied, there arises a need of designating and setting which one of the logical volumes to a copy destination. Further, data stored as "file data" is sometimes stored in a plurality of logical volumes. In such a case, if particular file data is to be copied, it is necessary to set logical volumes serving as copy destinations without overlap in one-to-one correspondence relation to the individual logical volumes storing that file data. In case there are many logical volumes representing copy sources of data, a person engaged in setting or a setter must constantly take care that a logical volume already set as a copy destination logical volume for a particular copy source logical volume is not set as a copy destination logical volume for another copy source logical volume. Deciding the correspondence relation between the copy source logical volume and the copy destination logical volume is troublesome and difficult and such setting work imposes an extremely hard load on the setter.

In view of the circumstances as above, the present invention has been made and it is an object of the invention to provide a picture data creating method, computer and program.

According to one aspect of the invention, in a picture data creation method for creating, by means of a computer, picture data necessary to display on a display unit a picture in which two or more items and input columns made to be correspondent with the individual items are provided, the input columns are provided for selecting setting values correspondent with the items from a plurality of setting value candidates which can be correspondent with the items and inputting the selected setting values, and the computer has a step of creating picture data necessary for causing the display unit to display a picture in which the mutually different setting value candidates are displayed as defaults in the individual input columns.

The aforementioned "item" may be of any type. When the present invention is applied to the storage system, an identifier of copy source memory volume, an identifier of copy source physical disk, an identifier of primary LU or an identifier of copy source LU, for instance, may be considered as the "item". The "setting value" is to be correspondent with each "item" and may be of any type. When the present invention is applied to the storage system, an identifier of copy destination memory volume, an identifier of copy destination physical disk, an identifier of secondary LU or an identifier of copy destination LU, for instance, may be considered as the "setting value". The "computer" may also be of any type. When the present invention is applied to the storage system, a host computer, an array controller, a management terminal, an information processing apparatus, a memory device controller, a channel controller or a disk controller, for instance, may be considered as the "computer". The "picture data" may also be of any type. For example, it may be a file described with such language as HTML or XML.

With this construction, it is possible to provide a GUI which can alleviate troublesomeness of work by the setter/operator engaged in setting the computer.

To accomplish the above object, a program for implementing the aforementioned function or a recording medium storing that program may suffice.

Other features and advantages of the present invention will become apparent from the following description of the specification taken in conjunction with the accompanying drawings.

BRIEF DESCRIPTION OF THE DRAWINGS

FIGS. 3A, 3B and 3C show an example of a default LU list according to an embodiment of the invention.

FIG. 6 is a diagram showing an appearance of a storage system according to the FIG. 5 embodiment of the invention.

FIGS. 8A and 8B are diagrams showing an example of construction of a memory device according to an embodiment of the invention.

FIGS. 9A and 9B are block diagrams showing an example of construction of a channel control unit according to an embodiment of the invention.

FIG. 10 shows an example of a LU management table according to an embodiment of the invention.

FIG. 11 is shows an example of a virtual logical volume management table according to an embodiment of the invention.

FIG. 18 shows an example of an empty LU list according to an embodiment of the invention.

FIG. 21 shows an example of a default LU list according to still another embodiment of the invention.

FIG. 33 shows another example of the empty LU list according to still another embodiment of the invention.

DETAILED DESCRIPTION OF THE EMBODIMENTS

Figure 1:
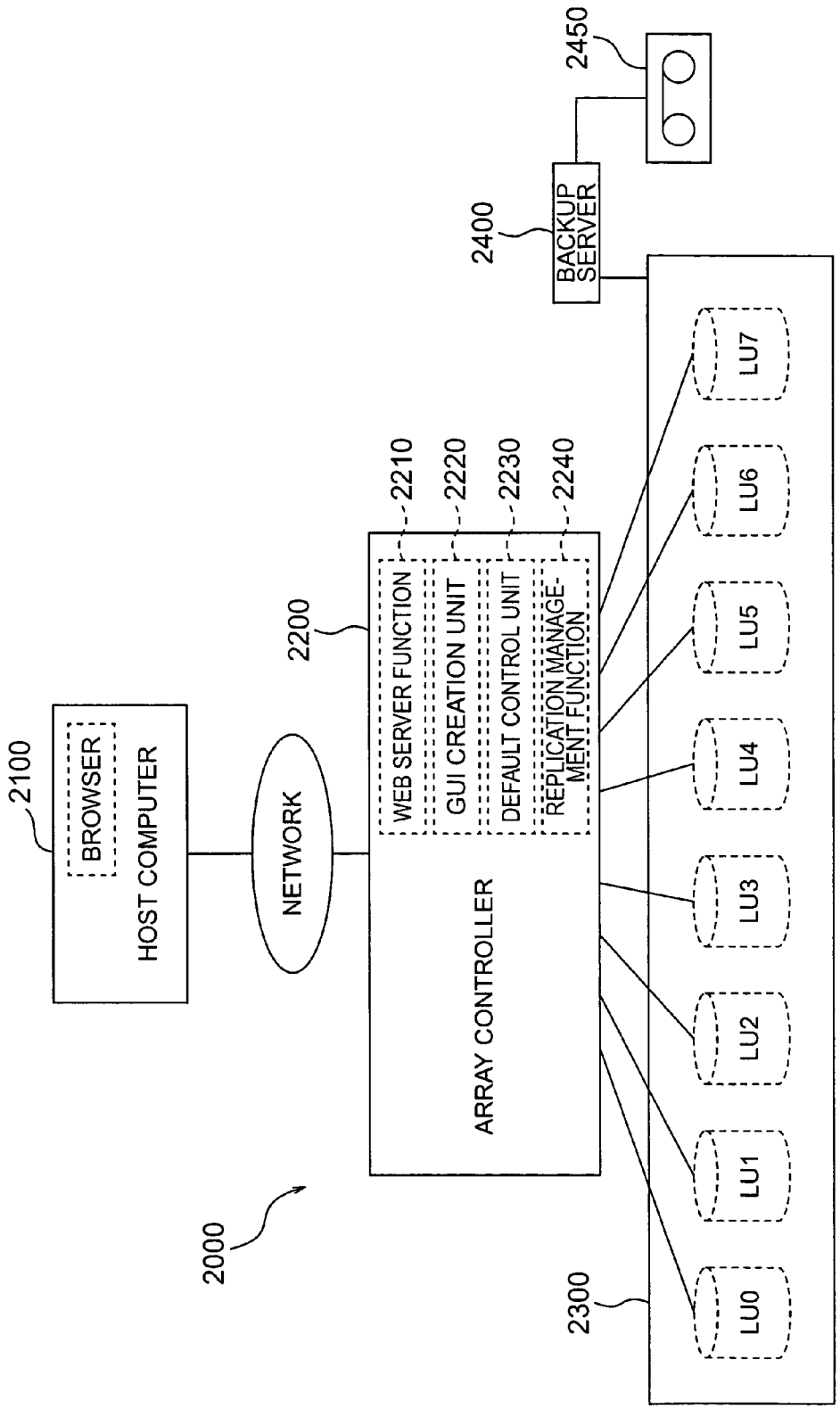
FIG. 1 is a block diagram showing an example of construction of a system according to an embodiment of the invention.

Examples of applying the present invention to a computer system 2000 as shown in FIG. 1 will be described hereunder. Here, the invention is applied to a situation in which secondary LU's are set in respect of a plurality of primary LU's, respectively.

Outline of Construction of Computer System

As shown in FIG. 1, the computer system 2000 comprises a host computer 2100, an array controller 2200 to which the host computer 2100 is connected and a disk array 2300 connected to the array controller 2200. The host computer 2100 and array controller 2200 may be connected together directly or through the medium of a network as illustrated. Assumptively, the shown network is a network based on the TCP/IP.

Figure 13:
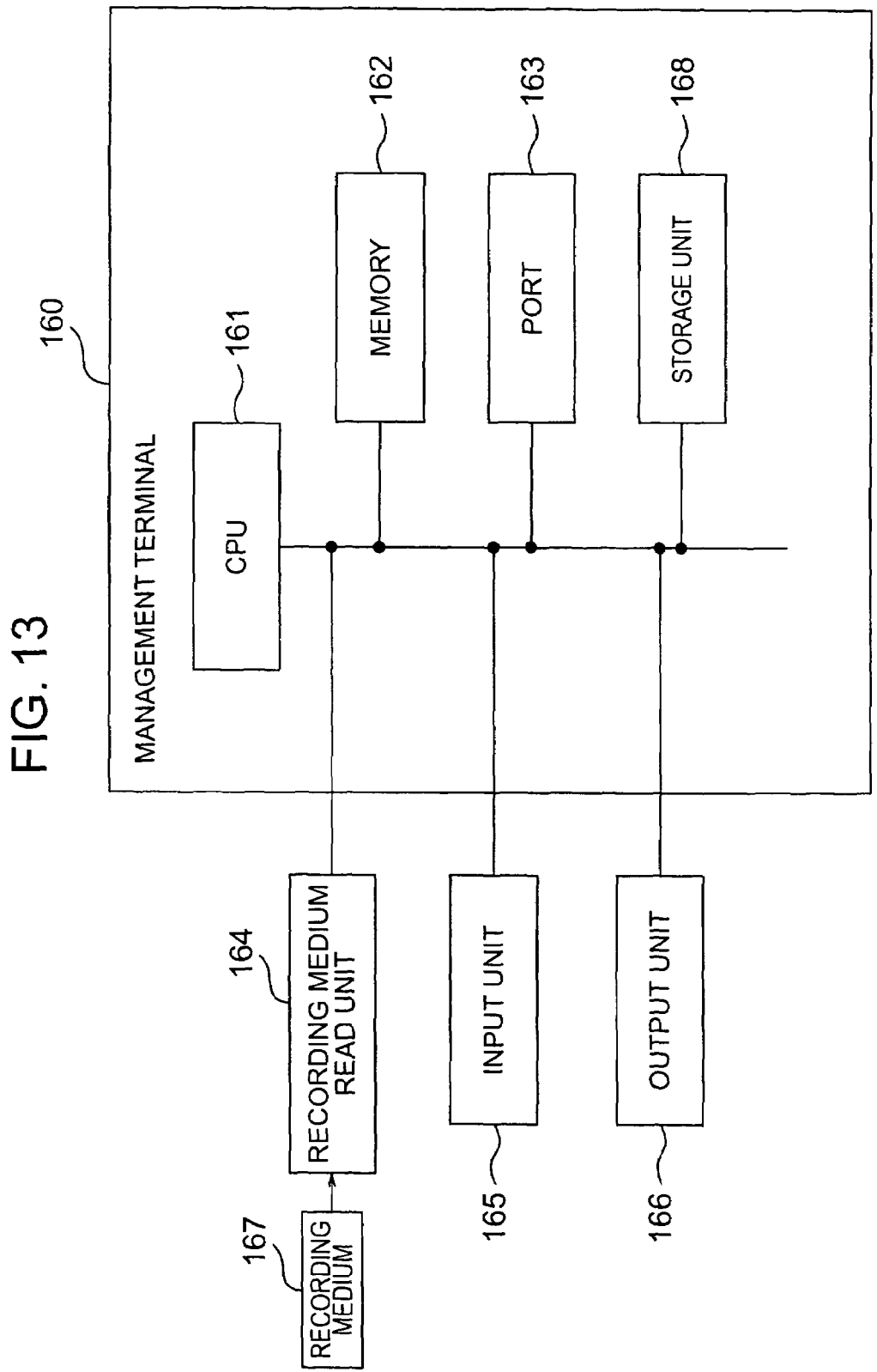
FIG. 13 is a block diagram showing an example of construction of a management terminal according to an embodiment of the invention.

The host computer 2100 is constructed as exemplified in FIG. 13, including a CPU for executing programs and performing operations, a memory for storing programs and data, a port for connection to the array controller 2200, a storage unit for storing programs and data, an input unit for performing input operations, an output unit for delivering (for example, displaying/printing) data and a recording medium read unit for installing various programs from a recording medium to the storage unit/memory. The host computer 2100 may be a computer of any type such as for example a personal computer.

As shown in FIG. 8A, for instance, the disk array includes many physical disks (in this figure, disks 301 to 309).

The array controller 2200 manages/controls the many physical disks of disk array 2300 and organizes many logical volumes (simply referred to as "LU's"; eight LU0 to LU7 in total in the example of FIG. 1).

The array controller 2200 is also a computer. Accordingly, it may take the same form as the host computer 2100 or for example, it may be a CPU for executing and operating programs or a unit (see FIG. 12A) having a memory/NVRAM for storing programs and data and an interface section for connection to the host computer 2100. In the case of such a form, programs can be installed from the recording medium read unit of the host computer 2100. It is to be noted that the LU's may also be organized through the RAID scheme.

A method has been known which forms pairs each having two LU's in the disk array 2300 of the computer system 2000 constructed as above and duplicates data between paired LU's. This is also termed "replication management".

The array controller 2200 provides for data a "replication management function" 2240 to store a replication of data stored in a particular LU (hereinafter referred to as "primary LU") also in a different LU (hereinafter referred to as "secondary LU"). The replication management function 2240 can be realized by causing the CPU of array controller 2200 to execute a program stored in the NVRAM. The array controller 2200 also has various functions including a function to act as a Web server to be described later and a function to act as a GUI creation unit 2220 also to be described later. These functions can also be implemented by causing the CPU to execute programs stored in the NVRAM.

Setting concerning the replication management function 2240 such as setting of a combination of a primary LU and a secondary LU storing its replication and controlling of the replication management function 2240 can be carried out by means of the host computer 2100 or a management terminal (not shown in FIG. 1) for managing the array controller 2200. Each of the host computer 2100 and the management terminal is installed with GUI software such as Web browser. A console picture (to be described later) for performing setting/control of the replication management function 2240 through the GUI software is displayed on the output unit of, for example, host computer 2100. The setter can set/control the replication management function 2240 of array controller 2200 through this console picture.

According to the "replication management function" described as above, the control state between primary LU and secondary LU can be shifted bi-directionally from "paired state" to "split state" or vice versa in accordance with a command from, for example, the host computer 2100.

In the "paired state", when the contents of the primary LU is updated, the contents of the secondary LU is also updated immediately. In other words, between the primary and secondary LU's placed in "paired state", identity of the contents of the two is maintained on real time base.

In the "split state", even when the primary LU is updated, the updated contents is not reflected upon the secondary LU immediately. Data written into the primary LU during the "split state" is reflected upon the secondary LU when both the primary and secondary LU's again shift to the "paired state". Difference data representative of a difference being present between the contents of the primary LU and that of the secondary LU during the "split state" is managed by the replication management function 2240. This difference data is managed in a unit of, for example, block set on the storage area of the LU.

Shift from "paired state" to "split state" is carried out when the host computer 2100, for instance, transmits an indication command to this effect (hereinafter referred to as "split command"). With the "paired state" shifted to the "split state", the contents of the secondary LU at the time that shift to the split state is initiated is kept to remain intact. The "split command" is transmitted when, for example, backup of data is carried out. If data of the secondary LU in "split state" is backed up to, for example, a magnetic tape 2450 through backup server 2400, the backup data can be acquired without affecting the primary LU. The "split command" is also transmitted in case the contents of the primary LU at a past time point is desired to be accessed. In other words, the contents of the secondary LU in the "split state" is so kept as to be identical to that at the time of shift to the split state and therefore, the user can access the contents of the primary LU at the past time point. The split command transmitted for such a use is sometimes called a "snapshot command". Also, the contents of the primary LU at a past time point to be held in the secondary LU is sometimes called a snapshot image.

Shift from "split state" to "paired state" is also carried out when, for example, the host computer 2100 transmits an indication command to this effect (hereinafter referred to as "rethink command"). The "rethink indication" is transmitted when, for example, backup is completed or the necessity for holding the snapshot image disappears. When the rethink command is transmitted, the replication management function 2240 utilizes the managed difference data to make the contents of the primary LU identical to that of the secondary LU and thereafter shift the control state between the primary and secondary LU's to the "paired state".

The present invention is applied to such a situation that pairs of LU's are formed to perform the replication management function as above.

Figure 2:
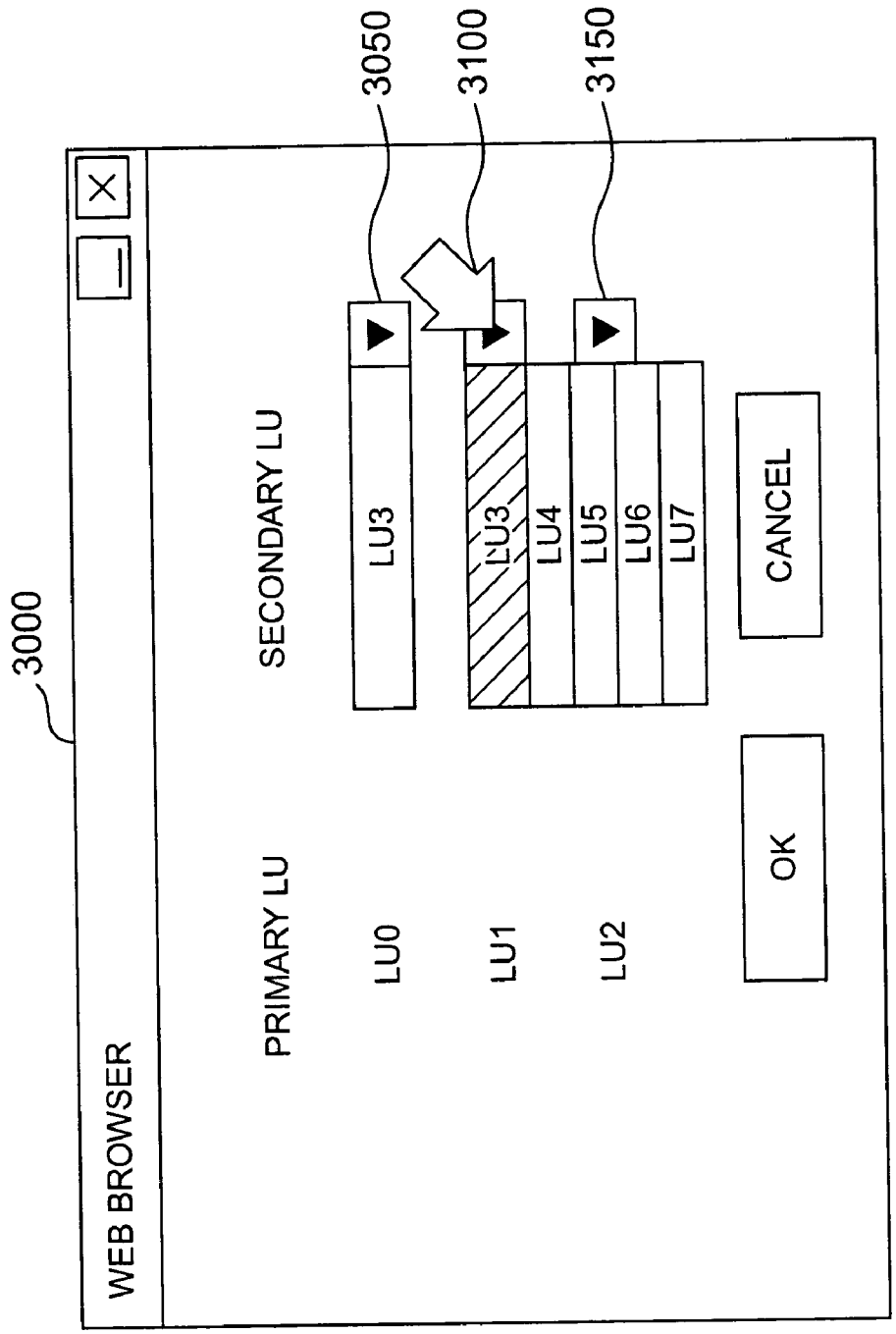
FIG. 2 is a diagram showing an example of a picture displayed on a display unit.

An example of a console picture 3000 displayed on a display unit 2150 in order to set the replication management function 2240 is shown in FIG. 2. In the console picture 3000, in respect of primary LU's (corresponding to "items" or "copy source storage volumes" to be set), secondary LU's (corresponding to "setting values" or "copy destination memory volumes") are set. On the left half of picture 3000, names (identifiers) of the primary LU's are displayed and on the right half, input columns 3050, 3100 and 3150 to which names (identifiers) of the secondary LU's to be set in correspondence with the individual primary LU's are inputted are displayed. In this example, a so-called "pull-down menu" scheme is employed for the input columns 3050, 3100 and 3150 and therefore, candidates which can be set for the secondary LU's are displayed in the pull-down menu.

Where the primary LU's to be set are LU0, LU1 and LU2, five LU's of LU3 to LU7 can be candidates for the secondary LU's (corresponding to "setting value candidates" or "copy destination memory volume candidates"). Accordingly, by operating the pull-down menu of each of the input columns 3050, 3100 and 3150 as shown in FIG. 2, one of the LU3 to LU7 can be selectively inputted as a secondary LU in respect of each of the LU0, LU1 and LU2.

In order to perform the replication management, different secondary LU's must be set in respect of the individual primary LU's. Accordingly, unless the console picture 3000 is provided with any type of contrivance, it is necessary that the input columns 3050, 3100 and 3150 be operated one by one to selectively input mutually different secondary LU names.

If, in such a case, mutually different secondary LU names are displayed as defaults in the respective input columns 3050, 3100 and 3150, such troublesome selective input operations as above can be dispensed with. By applying the present invention to such a situation, the aforementioned selective inputs can be omitted to mitigate troublesome work loaded on the setter.

Picture Data Creating Process

A default control unit 2230 of array controller 2200 can determine names of secondary LU candidates displayed as defaults at pull-down menus in the input columns 3050, 3100 and 3150 of console picture 3000.

The default control unit 2230 prepares a "default LU list" 4000 as shown in FIGS. 3A to 3C and stores it in a memory. This default LU list 4000 has a "secondary LU candidate" column 4100 and a "default flag" column 4200. Described in the "secondary LU candidate" column 4100 are names of candidates for the secondary LU's (in this example, LU3 to LU7). The "default flag" column 4200 indicates which ones of the secondary LU candidates are determined as secondary LU candidates to be displayed as defaults in the input columns 3050, 3100 and 3150. It is now assumed that respective fields of "default flag" column 4200 are all described with "0" initially. When a particular LU is settled as a secondary LU candidate displayed as a default, "1" is described at a field corresponding to that LU in the "default flag" column 4200.

The default control unit 2230 first determines a secondary LU candidate to be displayed as a default in the input column 3050 in respect of LU0 which is one of the primary LU's. The default control unit 2230 consults the "default flag" column 4200 of default LU list 4000. At present, all fields in "default flag" column 4200 are described with "0" (status shown in FIG. 3A). Then, the default control unit 2230 determines that LU3 recorded at the uppermost field of list 4000 is to be displayed as a default in the input column 3050 corresponding to LU0. The control unit then stores the result of this determination in, for example, the memory and at the same time, describes "1" at the field corresponding to LU3 in the "default flag" column 4200 of default LU list 4000 (status shown in FIG. 3B).

Next, the default control unit 2230 determines a secondary LU candidate to be displayed as a default in the input column 3100 in respect of LU1 which is one of the primary LU's. The default control unit 2230 consults the "default flag" column 4200 of default LU list 4000. At present, in the "default flag" column 4200, "1" is described at only the field corresponding to LU3 (status shown in FIG. 3B). Then, the default control unit 2230 determines that LU4 recorded next to LU3 is to be displayed as a default in the input column 3100 corresponding to LU1. The control unit then stores the result of this determination in, for example, the memory and describes "1" also at the field corresponding to LU4 in the "default flag" column 4200 of default LU list 4000 (status shown in FIG. 3C).

The default control unit 2230 proceeds with a process similar to the above in respect of the input column 3150 corresponding to LU2. As a result, it determines that LU5 is to be displayed as a default in the input column 3150 corresponding to LU2.

When secondary LU's to be displayed as defaults are settled in respect of all of the primary LU's, the default control unit 2230 informs the GUI creation unit 2220 of the result of decision.

The GUI creation unit 2220 creates picture data necessary to display such a console picture as reflecting the decision result. Then, the GUI creation unit transmits the created picture data to a Web server function 2210.

The Web server function 2210 transmits this picture data to a Web browser of host computer 2100. The Web browser displays the console picture on the output unit on the basis of the received picture data.

Figure 4:
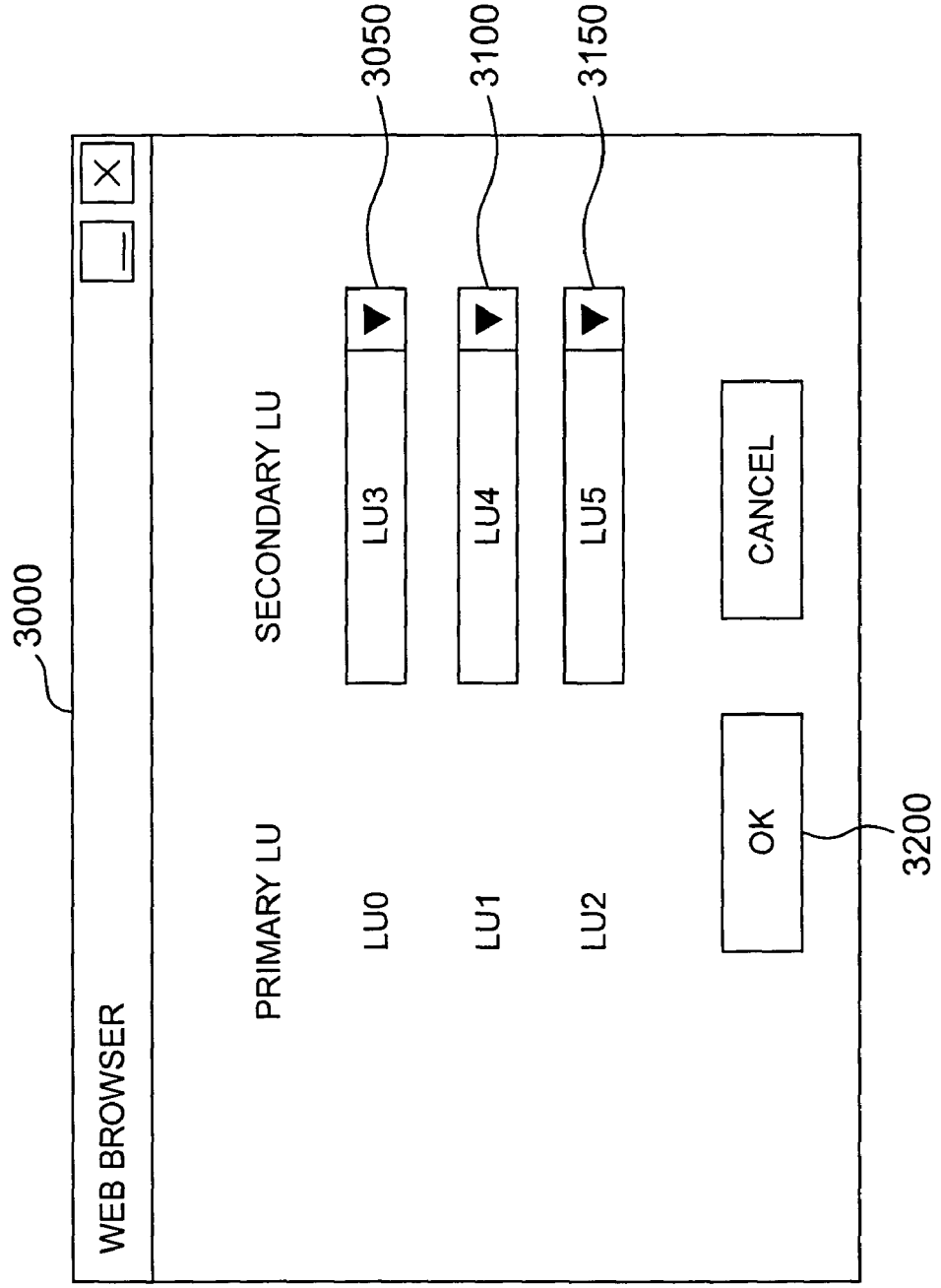
FIG. 4 is a diagram showing an example of a picture displayed on the display unit according to an embodiment of the invention.

An example of the console picture 3000 displayed on the output unit is shown in FIG. 4. Mutually different names of secondary LU's (namely, LU3, LU4 and LU5) are displayed without overlap in the input columns 3050, 3100 and 3150 of console picture 3000. With the construction as above, the setter can make the correspondence between the respective primary LU's and the different secondary LU's without overlap by merely pressing an "OK" button 3200 displayed on the console picture without resort to application of further operation to the input columns 3050, 3100 and 3150. In other words, it is not necessary to make the secondary LU's correspondent with the respective primary LU's one by one by operating the input columns 3050, 3100 and 3150. Accordingly, the above construction can ensure that the setter can be freed from labor and time to a large extent and troublesomeness of work can be alleviated.

Figure 5:
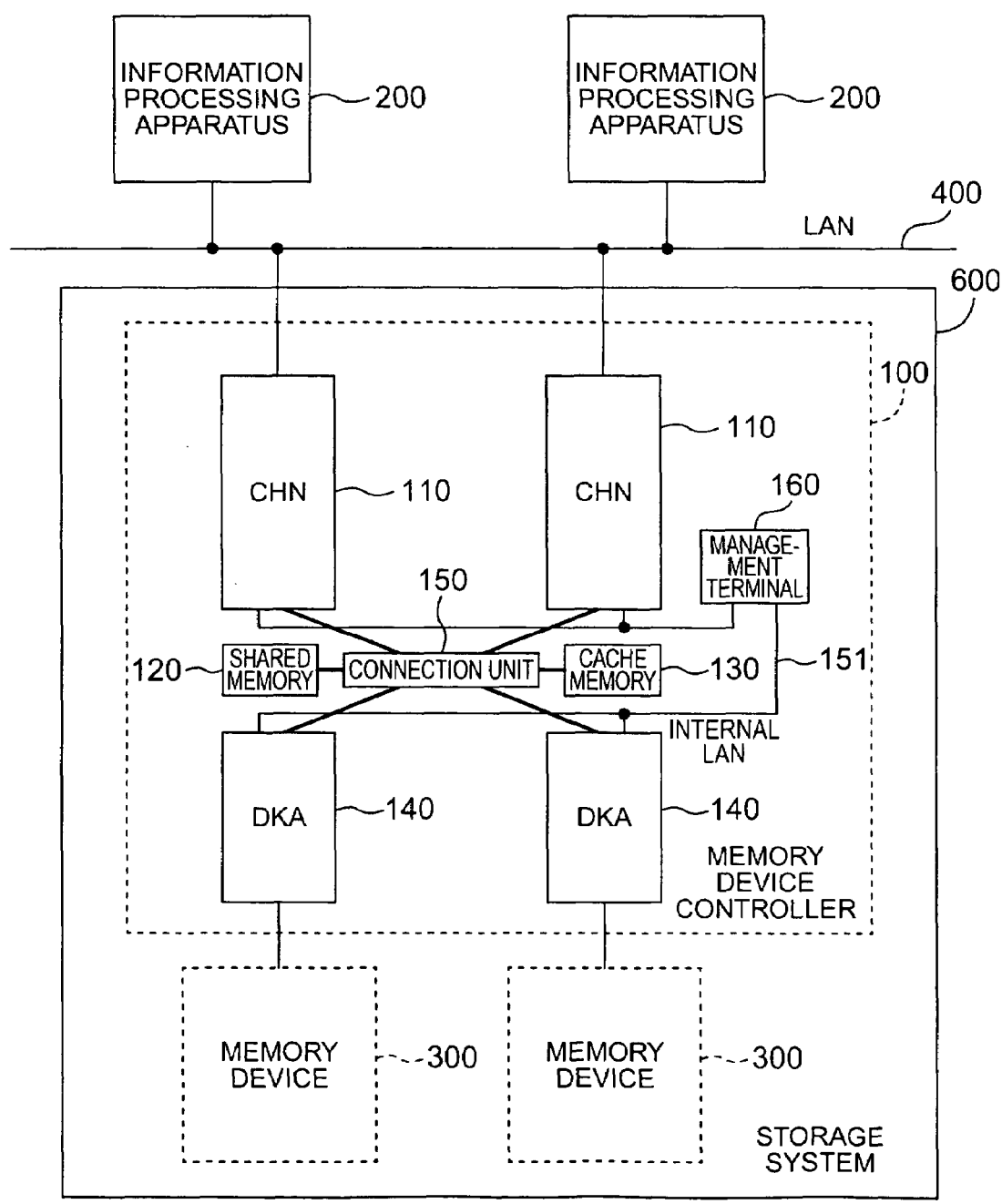
FIG. 5 is a block diagram showing an example of a system according to another embodiment of the invention.

The invention can also be applied to a storage system as shown in FIG. 5 (also termed NAS). In the present embodiment, too, a situation is assumed in which copy destination logical volumes (LU's) representing copy destinations of data are made to be correspondent with a plurality of copy source logical volumes (LU's) representing copy sources of data, respectively.

Outline of Construction of Storage System

An example of construction of the storage system to which the invention is applicable will first be described.

<<Storage System>>

An example of construction of a storage system 600 is illustrated in FIG. 5. The storage system 600 illustrated in FIG. 5 includes a memory device controller 100 and memory devices 300. Each memory device 300 provides a physical or logical storage area for storing data. The memory device controller 100 manages and controls the memory devices 300. The memory device controller 100, and memory device 300 will be detailed later.

Although one memory device controller 100 and two memory devices 300 are illustrated in the example of FIG. 5, the memory device controller 100 and memory devices 300 are not limited in number to the above. The memory device controller 100 and the memory devices 300 can be connected directly to each other as shown in FIG. 5 or they may be connected together indirectly through a network.

As shown in FIG. 5, the storage system 600 is connected to information processing apparatus 200 through a LAN (local Area Network) 400. The storage system 600 provides for these information processing apparatus 200 a storage area for storing data, file sharing service and the like. On the other hand, these information processing apparatus 200 can apply various kinds of setting to the storage system 600.

Referring to FIG. 6, there is illustrated an appearance of the storage system 600 according to the present embodiment. In the present embodiment, the memory device controller 100 and the memory devices 300 are housed in different consoles and the consoles are located adjacently to each other. Obviously, however, the memory device controller 100 and the memory devices 300 may be housed in the same console.

<<Information Processing Apparatus>>

Figure 7A:
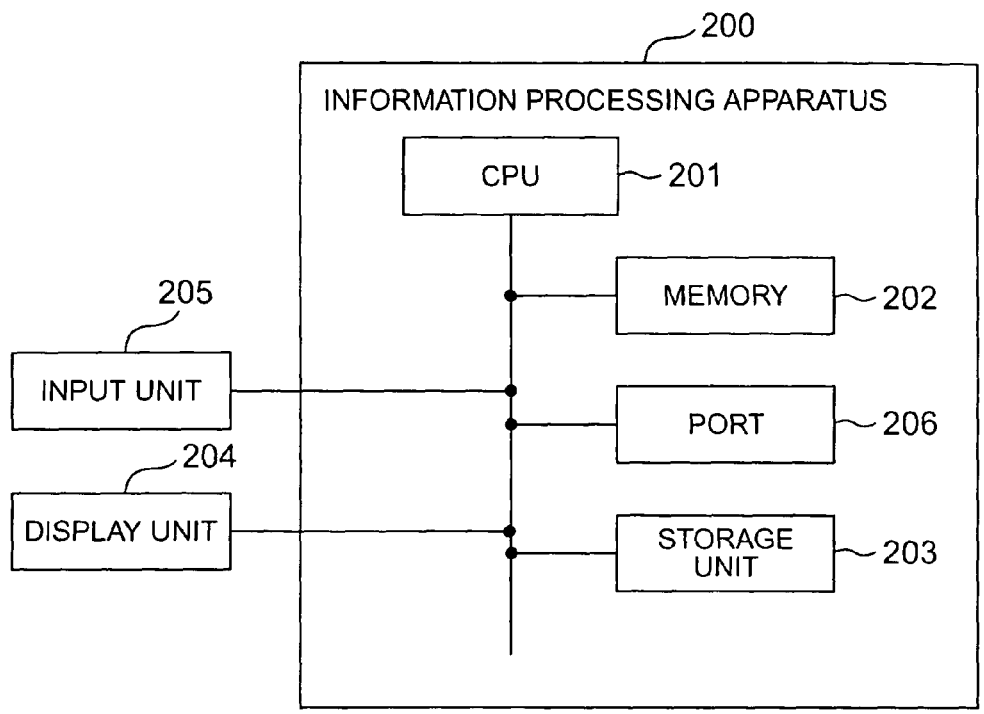
FIGS. 7A and 7B are block diagrams showing an example of construction of an information processing apparatus according to an embodiment of the invention.
Figure 7B:
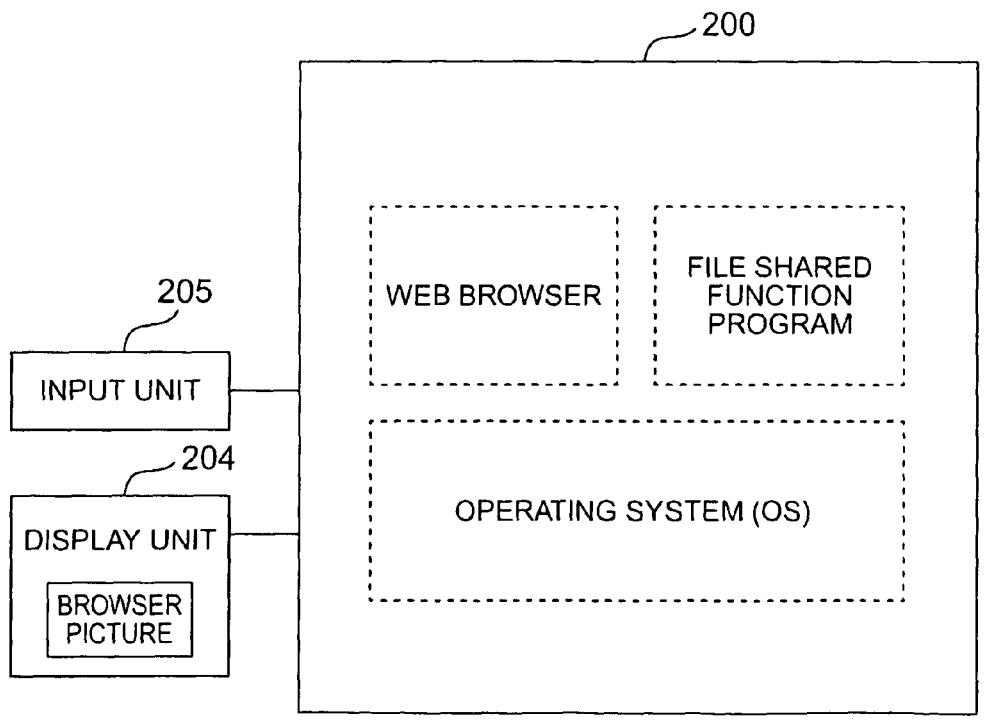

An example of physical construction of the information processing apparatus 200 connected to the storage system 600 is illustrated in FIG. 7A and an example of its logical construction is illustrated in FIG. 7B.

As shown in FIG. 7A, the information processing apparatus 200 includes a CPU (Central Processing Unit) 201, a memory 202, a storage unit 203, a display unit 204, an input unit 205 and a port 206. The storage unit 203 and memory 202 of information processing apparatus 200 are stored with various kinds of programs. The stored programs can be exemplified as including an operating system (OS), a file sharing function program and a Web browser (see FIG. 7B). When the CPU 201 of information processing apparatus 200 executes these programs, various functions can be implemented.

Figure 14:
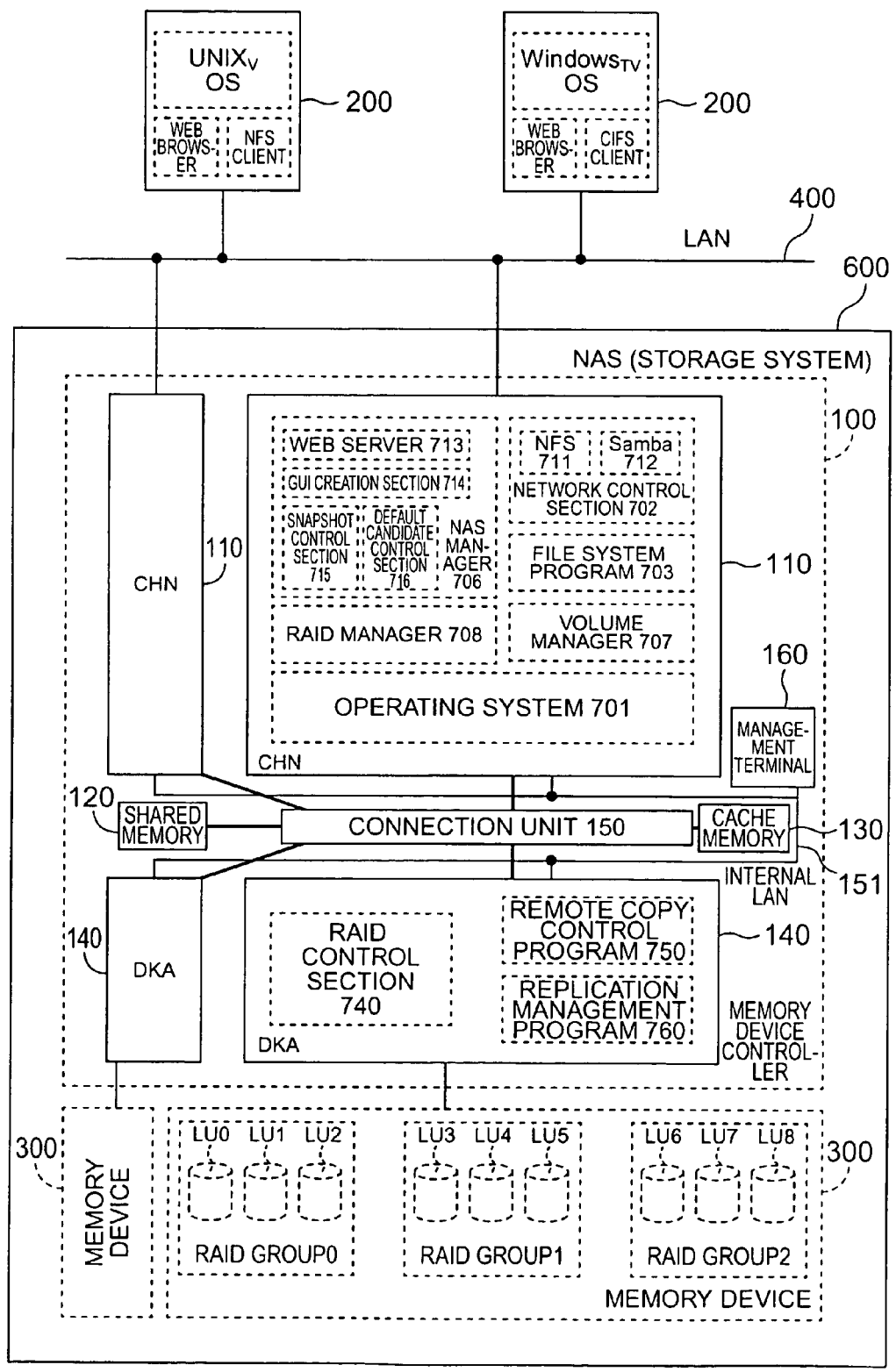
FIG. 14 is a block diagram showing an example of construction of software of the FIG. 5 system according to an embodiment of the invention.

It is assumed that on the individual information processing apparatus 200, mutually different OS's (in an example of FIG. 14, Unix (registered trademark) and Windows (registered trademark)) are operating.

By virtue of its file sharing function program, the information processing apparatus 200 can transmit a "file access request" to the storage system 600.

(The "file access request" means a request for performing data access by designating a file name). Through this, the information processing apparatus 200 can receive a file sharing function service from the storage system 600. As the file sharing function program, NFS (Network File System) client and CIFS (Common Interface File System) client are available (see FIG. 14).

The Web browser of the information processing apparatus 200 can transmit/receive a request/response to/from a Web server (to be described later) of storage system 600 by following a communication protocol such as HTTP or FTP. Thanks to this contrivance, the information processing apparatus 200 can apply various kinds of setting to the storage system 600.

For example, the information processing apparatus 200 may be a personal computer or workstation or may be a mainframe computer. Although the two information processing apparatus 200 are illustrated in FIG. 5, the number of the information processing apparatus 200 is not limited to two. Further, the OS's operating on the information processing apparatus 200 are not limited to those described above.

A LAN 400 may be a dedicated network including VLAN, VPN or the like but instead, it may use Internet, WAN or the like. Communication can be made between the information processing apparatus 200 and the memory device control unit 100 through the medium of the LAN 400 pursuant to the communication protocol such as TCP/IP.

<<Memory Device>>

An example of physical construction of the memory device 330 is illustrated in FIG. 8A and an example of its logical construction is illustrated in FIG. 8B.

The memory device 300 is comprised of many disk drives (physical disks) 301 to 309 to provide physical or logical storage areas for the information processing apparatus 200. On these physical storage areas provided by the disk drives, logical volumes (logical units or LU's) are set logically. Data is stored in these LU's. As the disk drive, various kinds of types, for example, hard disk device, flexible disk device and semiconductor memory device can be used. In FIG. 8A, nine disk drives 301 to 309 are illustrated in the memory device 300 but the number of the disk drives is not limited thereto.

In the memory device 300, a disk array may be formed of the plurality of disk drives 301 to 309. In this case, by managing/operating the disk array through the RAID scheme, logical storage areas may be provided for the information processing apparatus 200. In the example of FIGS. 8A and 8B, nine LU's (LU0 to LU8) are set on the nine disk drives 301 to 309 incorporated in the memory device 300. Then, the nine disk drives 301 to 309 are divided into three groups (termed RAID groups 0 to 2). Each group is managed through the RAID scheme. The management/ operation of the disk array based on the RAID scheme can be carried out by means of the memory device controller 100 as will be described later. The number and combination of the RAID groups are not limited to the above and besides the number and the manner of organization of the LU's are not limited to those illustrated.

Available as the LU set in the memory device 300 is a "user LU" accessible from the information processing apparatus 200 or a "system LU" used for controlling a channel control unit (CHN) 110 of memory device controller 100 to be described later. The system LU stores an OS executed by the CHN 110 and various kinds of programs to be described later. It is now assumed that the LU0 to LU8 shown in FIGS. 8A and 8B are all user LU's.

<<Memory Device Control Unit>>

As shown in FIG. 5, the memory device controller 100 is connected to the information processing apparatus 200 through the LAN 400 and transmits/receives commands for managing/controlling the storage system 600 and requests/ responses to/from the information processing apparatus 200.

The memory device controller 100 is also connected to the memory devices 300 so as to control the memory devices 300 in accordance with commands received from the information processing apparatus 200. For example, the memory device controller receives a request for input/output of data from the information processing apparatus 200 to perform a process for input/output of data stored in the memory devices 300.

The memory device controller 100 as shown in FIG. 5 includes two CHN's 110, a shared memory 120, a cache memory 130, two disk control units (DKA) 140, a management terminal 160 and a connection unit 150. The number of constituent components of the memory device controller 100 is not limited thereto.

<<Channel Control Unit (CHN) 110>>

An example of physical construction of the CHN 110 is illustrated in FIG. 9A and an example of its logical construction is illustrated in FIG. 9B. Referring now to FIGS. 5, 9A, 9B and 14, the CHN 110 will be described.

(1) Example of Hardware Construction of CHN 110

As shown in FIG. 9A, the CHN 110 of the present embodiment is formed into a single unit. Hereinafter, this unit will also be termed "NAS board". The NAS board is formed of a circuit board, including a network interface section 111, a CPU 112, a memory 113, an input/output control section 114, an I/O (input/output) processor 119, NVRAM (non-volatile RAM) 115, connectors for board connection 116 and communication connectors 117. These components constitute a single unit 118.

The network interface section 111 is a communication interface for communication with the information processing apparatus 200. For example, it receives a file access request, a HTTP request and the like transmitted from the information processing apparatus 111.

The communication connector 117 is a connector for communicatively connecting the memory device controller 100 to the information processing apparatus 200 through the LAN 400. For example, it corresponds to Ethernet (registered trademark).

The CPU 112 takes charge of control for making the CHN 110 function as NAS board.

Various kinds of programs and data are stored in the memory 113. For example, it stores tables as shown in FIGS. 10 and 11 and various kinds of programs such as NAS manager 706 as shown in FIG. 9B. The CPU 112 executes programs stored in the memory 113 and previously-described system LU to implement a software construction to be described later.

The input/output control section 114 transmits/receives data and commands to/from the DKA 140, cache memory 130, shared memory 120 and management terminal 160. The input/output control section 114 includes the I/O processor 119 and NVRAM 115. The I/O processor 119 controls the aforementioned transmission/reception of data and commands. The NVRAM 115 is a non-volatile memory for storing a program for taking charge of control of the I/O processor 119.

The board connection connectors 116 are coupled to connectors (not shown) provided in the memory device controller 100. This permits the NAS board to electrically connect to the memory device controller 100.

The two CHN's 110 according to the present embodiment are connected to each other by an internal LAN 151. Each CHN 110 also connects to the management terminal 160 through the medium of this internal LAN 151. This construction ensures that a computer program such as microprogram the CHN 110 is caused to execute can be transmitted from the management terminal 160 and can be installed to the CHN 110. Construction of the management terminal 160 will be described later.

As described above, the CPU 112 of CHN 110 executes various kinds of programs stored in the memory 113 and system LU, so that the software construction shown in, for example, FIG. 9B can be realized. This type of software construction will be described below.

(2) Example of Software Construction of CHN 110

As shown in FIG. 9B, on an operating system 701 of CHN 110 (also termed an NAS head), such software as RAID manager 708, volume manger 707, file system program 703, network control section 702 and NAS manager 706 operates.

(a) RAID Manger 708

The RAID manager 708 has a function to set parameters in an RAID control section 740 of DKA 140 (to be described later; see FIGS. 12B and 14) and a function to control the RAID control section 740. More particularly, the RAID manager 708 receives a parameter and control command or indication information from the operating system 701 or another application or management terminal operating on the operating system 701 to set the received parameter to the RAID control section 740 or transmit a control command corresponding to the RAID control section command or indication information. To add, the RAID control section 740 of DKA 140 has a function to set a disk drive (physical disk) of memory device 300 and an LU while making the correspondence therebetween and a function to set/manage a RAID group.

For example, as the "parameter" to be set herein, parameters for defining the disk drives (physical disks) 301 to 309 constituting the RAID group and parameters for indicating the emulation type and capacity of the LU are available. The "emulation type" is a parameter for prescribing "operational specifications" of the LU. The "operational specifications" prescribed by the emulation type may include, for example, volume capacity (capacity of LU), logical track capacity (the number of bytes per logical track constituting the LU), logical track number/logical cylinder (the number of logical tracks constituting one logical cylinder) and logical cylinder number /volume (the number of logical cylinders constituting one LU). The correspondence to be made between each LU and each of the parameters is managed by means of the RAID control section 740 through the use of "LU management table" 800 as shown in FIG. 10.

In the LU management table 800, in addition to "LU name" 810 of each LU, the aforementioned "emulation type" 820 of LU, "capacity" 830 of LU and "RAID group name" 840 to which LU's belong, "physical disk number" 850 of a physical disk to which each LU is set and "use flag" 860 indicating whether each LU is in use are managed. When the LU is in use, "1" is inputted to the use flag 860. When the LU is in disuse, "0" is inputted to the use flag 860. For example, the above table 800 may be stored in the memory 143 or NVRAM 144 (to be described later; see FIG. 12A) of DKA 140, in the shared memory 120 or management terminal 160 of memory device controller 100 or in the system LU of memory device 300.

Available as the control command the RAID manager 708 transmits to the RAID control section 740 are a command for designating the construction/delete/ capacity change of RAID and a command for requesting the construction information of each LU and each RAID group (hereinafter termed "construction information request command").

(b) Volume Manager 707

The volume manager 707 has a function to provide a virtual logical volume (virtual logical unit group, hereinafter referred to as "VLU") to the file system program 703. The "virtual logical volume (VLU)" is a logical group obtained by further organizing the LU's set on the memory device 300 in a virtual fashion. One VLU is comprised of one or more LU's. In this construction, the file system program 703 and information processing apparatus 200 recognize the VLU instead of the LU's.

The volume manager 707 uses a "virtual logical volume management table" 900 as shown in FIG. 11 to manage the correspondence between a VLU (910) and an LU or LU's (920) constituting the VLU. For example, this table may be stored in the memory 113 or NVRAM 115 of CHN 110, the shared memory 120 or management terminal 160 of memory device controller 100 or the system LU of memory device 300.

(c) File System Program 703

The main function of the file system program 703 is to manage the correspondence between a file name designated in a file access request received by the network control section 702 and an address on VLU at which the file name is stored. The file system program 703 can specify, for example, an address on VLU corresponding to a file name designated in a file access request.

(d) Network Control Section 702

The network control section 702 is constructed on the basis of two file system protocols of NFS 711 and Samba 712. The NFS 711 receives a file access request from the information processing unit 200 of a UNIX (registered trademark) system in which the NFS client (see FIG. 14) operates. On the other hand, the Samba 712 receives a file access request from the information processing unit 200 of Windows (registered trademark) system in which the CIFS client (see FIG. 14) operates.

(e) NAS Manager 706

The NAS manager 706 is a program for performing confirmation of the operational state of the storage system 600 (namely NAS) and setting/control of the storage system 600.

The NAS manager 706 also functions as Web server 713, GUI creation section 714, snapshot control section 715 and default candidate control section 716.

The Web server 713 provides a Web page for performing setting/control of the storage system 600 to the information processing apparatus 200. More specifically, the Web server 713 of NAS manager 706 responds to a HTTP request from the information processing apparatus 200 to transmit data of a Web page to the information processing apparatus 200. A system manager of storage system 600 can command or designate setting/control of the storage system 600 by using the input unit 205 to operate the Web page while watching the Web page displayed on the display unit 204 of information processing apparatus 200. For example, with the Web page, (1) management/setting of LU (for example, setting of capacity, management of capacity, expand/reduction of capacity and user allotment) and (2) setting/control concerning such functions as replication management and remote copy (replication) performed by the DKA 140 (for example, setting/change of copy source LU and copy destination LU) can be carried out. By operating the Web page, data concerning setting/control of the storage system 600 can be transmitted to the NAS manager 706.

The NAS manager 706 receives the data concerning setting/control to execute setting/control corresponding to the data. This enables the information processing apparatus 200 to perform various kinds of setting and control of the storage system 600.

The GUI creation section 714, snapshot control section 715 and default candidate control section 715 of NAS manager 706 cooperate with the volume manager 707 and RAID manager 708 and the RAID control section 740 of DKA 140 to function as an "application server" of Web server 713. Then, in the present embodiment, these components functioning as the "application server" create "picture data". In other words, in the present embodiment, the memory device controller 100 including the components functioning as the "application server" functions as a "computer for creating picture data". These components will operate as will be detailed later.

<<Disk Control Unit (DKA) 140>>

The DKA 140 is adapted to control the memory device 300.

Figure 12A:
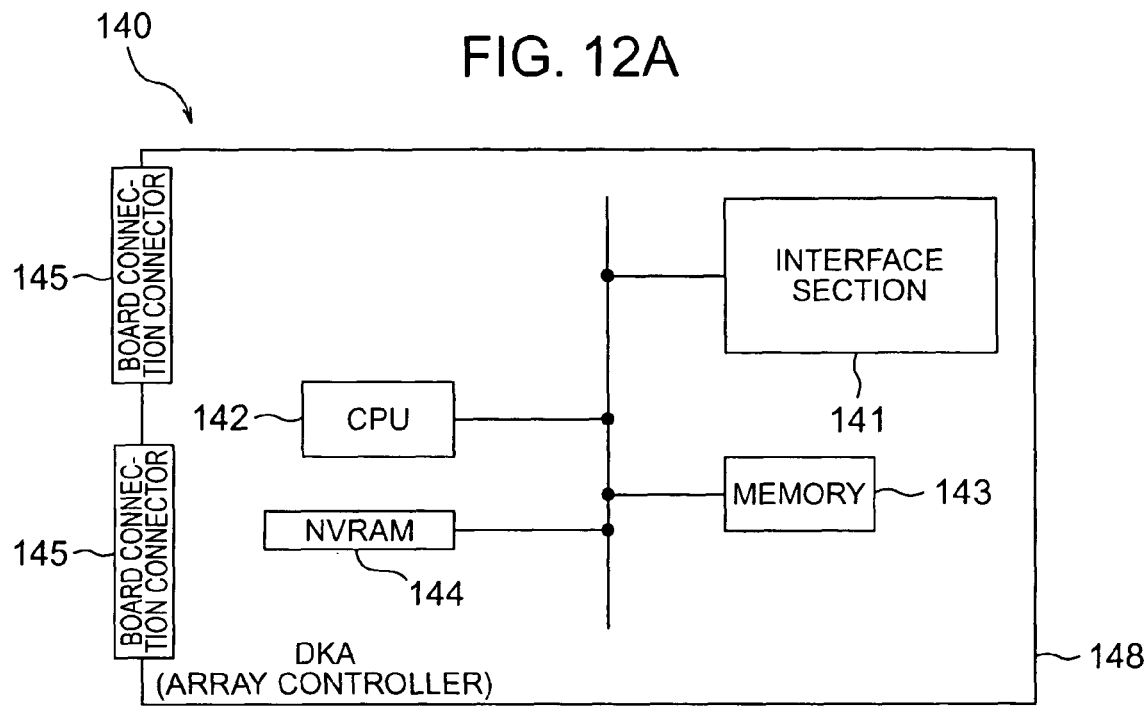
FIGS. 12A and 12B are block diagrams showing an example of construction of a disk control unit according to an embodiment of the invention.
Figure 12B:
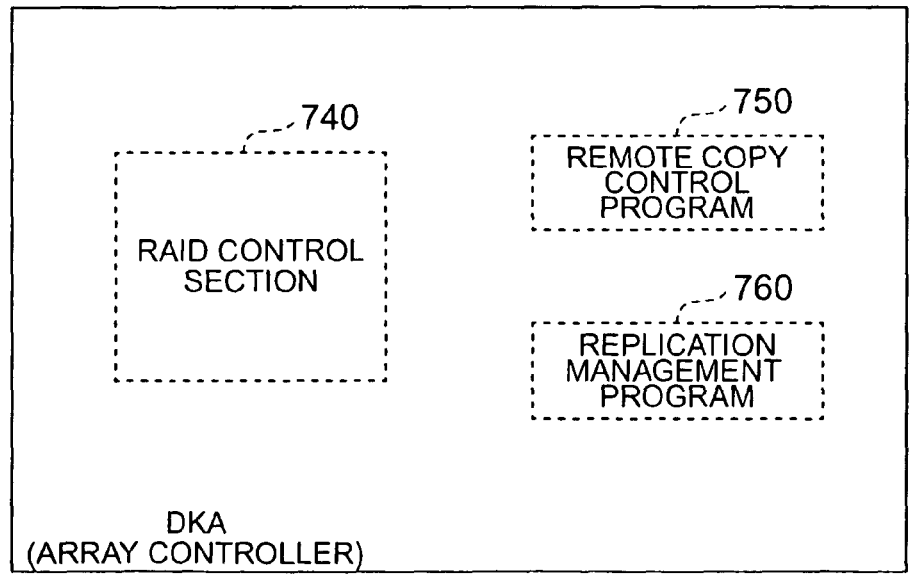

An example of physical construction of the DKA 140 is illustrated in FIG. 12A and an example of its logical construction is illustrated in FIG. 12B. The DKA 140 will be described hereunder by making reference to FIGS. 5, 12A, 12B and 14.

(1) Example of Hardware Construction of DKA 140

As shown in FIG. 12A, the DKA 140 of the present embodiment includes an interface section 141, a memory 143, a CPU 142, a NVRAM 144 and connectors for board connection 145. These components are formed into a single unit 148.

The interface section 141 serves as not only a communication interface for performing communication with the CHN's 110 through the connection unit 150 but also a communication interface for performing communication with the memory device 300.

The CPU 142 takes charge of control of the overall DKA 140 and besides communicates with the CHN's 110, memory devices 300 and management terminal 160.

Various kinds of programs and data are stored in the memory 143.

The NVRAM 144 is a non-volatile memory for storing programs taking charge of control of the CPU 142.

When the CPU 142 executes the programs stored in the memory 143, NVRAM 144 and system LU described previously, software construction to be described later can be realized. Further, as described previously, the aforementioned LU management table 800 (see FIG. 10) may sometimes be stored in the memory 143 and NVRAM 144.

The board connection connectors 145 are coupled to connectors (not shown) provided to the memory device controller 100. This ensures that the DKA 140 can be connected electrically to the memory device controller 100.

The two DKA's 140 in the present embodiment are connected to each other by the internal LAN 151. Each DKA 140 is also connected to the management terminal 160 by means of this internal LAN 151. With this construction, a computer program such as a microprogram to be executed by the DKA 140 can be transmitted from the management terminal 160 and can be installed to, for example, the NVRAM 144 of DKA 140. The management terminal 160 is constructed as will be described later.

As described above, by causing the CPU 142 of DKA 140 to execute various kinds of programs stored in the memory 143, NVRAM 144 and system LU, software construction as shown in FIG. 12B, for instance, can be realized. This software construction will be described below in brief.

(2) Example of Software Construction of DKA 140

As shown in FIG. 12B, such software as RAID control section 740, remote copy control program 750 and replication management program 760 operates on the DKA 140.

(a) RAID Control Section 740

As described above, the RAID control section 740 functions to set LU's by making the correspondence between disk drives (physical disks) of memory device 300 and LU's and set/manage RAID groups. The RAID control section 740 manages the correspondence between each LU and various kinds of parameters (described previously) by using the LU management table 800 (see FIG. 10).

Also, as described previously, the RAID control section 740 follows or complies with a control command transmitted from the RAID manager 708 to perform the construction/delete/capacity change of RAID and the input/output to/from the memory device 300 and follows a construction information request command to transmit construction information of each LU and each RAID group.

Since the CHN 110 and information processing apparatus 200 transmit a request for access to data of an LU by designating a logical address, the RAID control section 740 converts the received data access request into a request for access to data of physical disks 301 to 309 based on or pursuant to physical address designation.

(b) Replication Management Program 760

The replication management program 760 performs the "replication management function" or the like described in connection with the foregoing embodiment.

(c) Remote Copy Control Program 750

The remote copy control program 750 aims at preventing disappearance of data in the event of occurrence of a disaster (disaster recovery) and provides a function to perform "replication" or "remote copy". The "replication" or "remote control" referred to herein means such control as storing a replication of data in the storage system 600 located at a specified site (primary site) into another storage system (not shown) located at another site (secondary site).

<<Connection Unit 150>>

The connection unit 150 mutually connects the CHN 110, shared memory 120, cache memory 130 and DKA 140. Transmission/reception of data and commands among the CHN 110, the share memory 120, the cache memory 130 and the DKA 140 is carried out through the connection unit 150. The connection unit 150 is, for example, a high-speed bus such as a super-high-speed crossbar switch adapted to perform data transmission by high-speed switching.

<<Shared Memory 120, Cache Memory 130>>

The shared memory 120 and cache memory 130 are storage memories shared by the CHN 110 and DKA 140. The shared memory 120 is utilized to mainly store control information and commands. The cache memory 130 is utilized to mainly store data.

For example, when a data input/output command a particular CHN 110 has received from the information processing apparatus 200 is a write command, that CHN 110 writes the write command to the shared memory 120 and at the same time, writes the writ data received from the information processing apparatus 200 to the cache memory 130. The DKA 140 monitors the shared memory 120 and when detecting that a write command is written to the shared memory 120, the DKA 140 reads written data from the cache memory 130 in accordance with that command and writes it to the memory device 300.

<<Management Terminal 160>>

The management terminal 160 is a computer for maintaining/managing the storage system 600. For example, as shown in FIG. 13, the management terminal 160 includes a CPU 161, a memory 162, a port 163, a recording medium read unit 164, an input unit 165, an output unit 166 and a storage unit 168.

In the management terminal 160, the CPU 161 implements various kinds of functions on the basis of programs/data stored in the memory 162/storage unit 168. For example, the management terminal 160 can function as a Web server. On the other hand, with the Web browser installed, the management terminal 160 can access the Web server 713 of NAS manager 706 in CHN 110 to permit a Web page transmitted from the Web server 13 to be displayed on the output unit 166.

The recording medium read unit 164 is a unit for reading programs and data recorded on a recording medium 167. The read programs and data are stored in the memory 162 or storage unit 168. Accordingly, a program recorded on the recording medium 167, for instance, can be read out of the recording medium 167 by using the recording medium read unit 164 so as to be stored in the memory 162 and storage unit 168. As the recording medium 167, a flexible disk, CD-ROM or semiconductor memory can be used.

The port 163 is connected to the internal LAN 151. This permits the management terminal 160 to transmit a program read by the recording medium read unit 164 to the CHN 110 and DKA 140.

Picture Data Creation Process

Software construction of the whole of the storage system 600 according to the present embodiment is illustrated in FIG. 14. An example for materializing the present invention in the storage system 600 constructed as above will be described below. In this example, a process in which a user operates the information processing apparatus 200 to determine a copy destination of data of a particular virtual logical volume (VLU) will be described by making reference to flowcharts of FIGS. 15 and 19.

Firstly, the user starts the Web browser in the information processing apparatus 200. Subsequently, the user inputs a suitable address to the Web browser (in this case, an address of a Web server 713 operating in the memory device controller 100) to transmit a HTTP request to the Web server 713 (as in S1000 in FIG. 15). The Web browser follows the inputted address to access the Web server 713 in the memory device controller (S1010) and then acquire from the Web server 713 a HTML file for displaying a Web page (hereinafter referred to as "system management console picture") 1500 (S1020). Then, the Web browser follows the acquired HTML file to display the system management console picture 1500 on the display unit 204 of information processing apparatus 200 (S1030).

Figure 16:
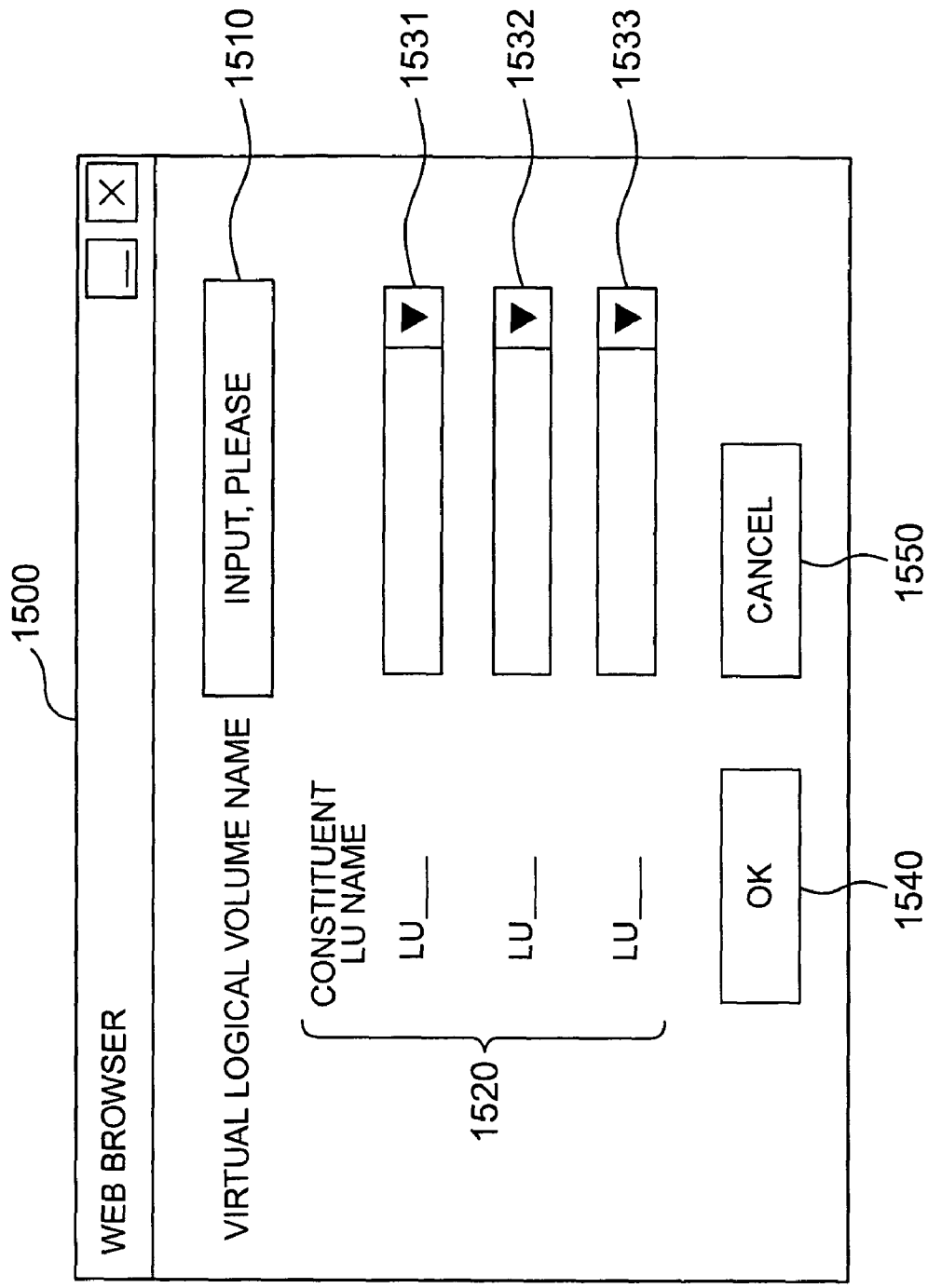
FIG. 16 is a diagram showing an example of a picture displayed on the display unit according to another embodiment of the invention.

An example of the system management console picture 1500 is illustrated in FIG. 16. Displayed in the picture 1500 are an input column 1510, a display part 1520, input columns 1531 to 1533, an "OK" button 1540 and a "cancel" button 1550. The input column 1510 is provided to input and designate a VLU desired to be copied. The display part 1520 is a part for displaying names of LU's constituting the designated VLU (corresponding to "items" to be set or "identifiers of copy source storage volumes"). The input columns 1531 to 1533 are provided to select and input names of LU's representing copy destinations in respect of individual LU's (corresponding to "setting values" to be set or "identifiers of copy destination storage volumes"). The "OK" button 1540 is pressed to transmit a HTTP request when inputting to the input columns 1510 and 1531 to 1533 is completed. The "cancel" button 1550 is provided for ending input to the picture 1500.

Figure 17:
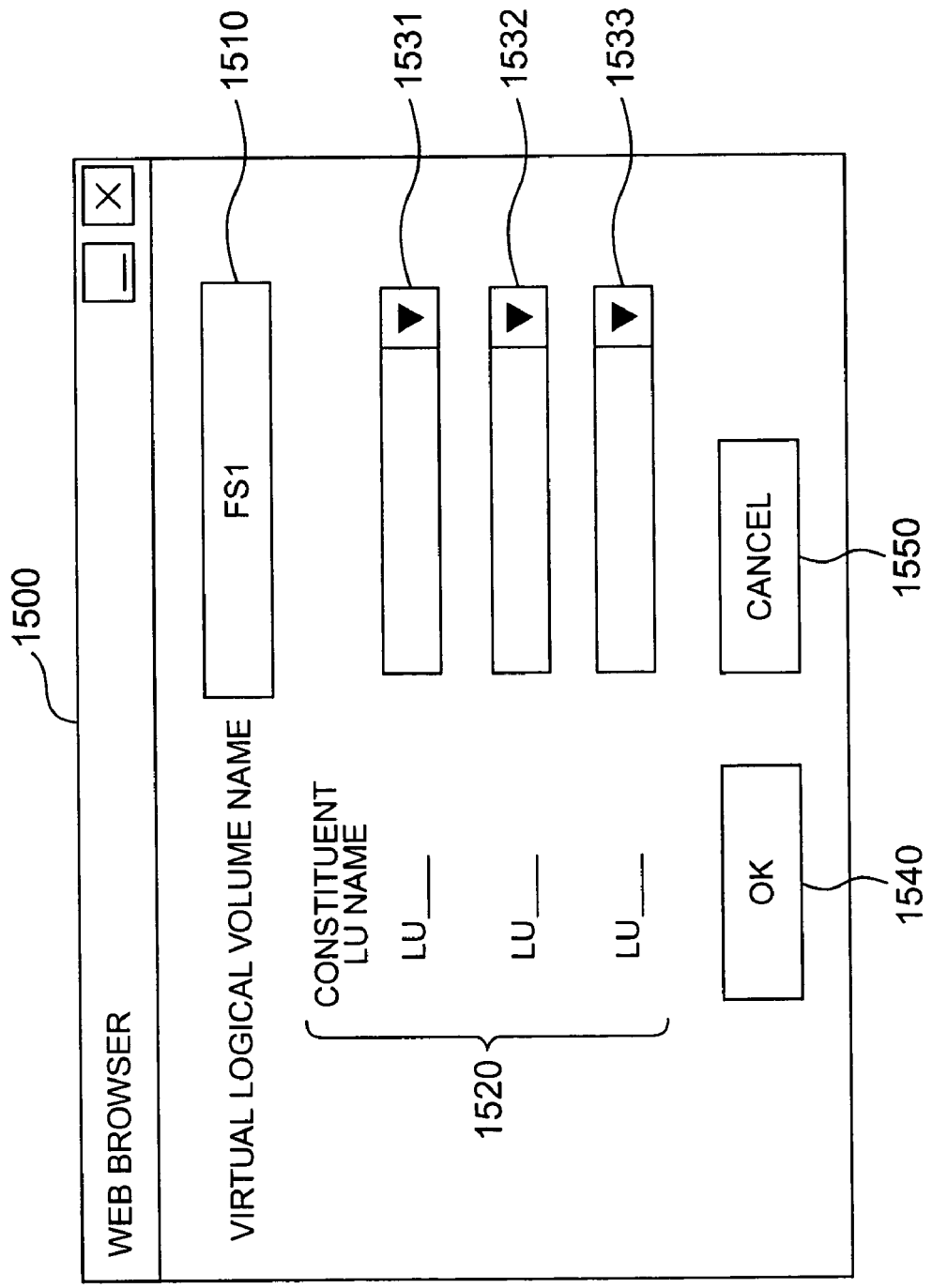
FIG. 17 is a diagram showing an example of a picture displayed on the display unit according to still another embodiment of the invention.

The user operates the input unit 205 of information processing apparatus 200 to input a name of a VLU desired to be copied (VLU name) to the input column 1510 of the displayed system management console picture. An inputted state is shown in FIG. 17. This example is to determine a copy destination of a VLU of a name "FS1" inputted to the input column 1510. When inputting is completed, the user presses the "OK" button 1540 on the picture to cause the Web browser to transmit data (S1040). The Web browser transmits the inputted data (VLU name "FS1") and at the same time, transmits to the Web server 713 a request for commanding return of names of LU's constituting the VLU and names of candidates for LU's which can be copy destinations of data in respect of the individual LU's (S1050).

The Web server 713 receiving this request starts the GUI creation section 714 (see FIG. 14) and transmits to this GUI creation section 714 a request for commanding the GUI creation section 714 to create a HTL file corresponding to the request (S1060).

The GUI creation section 714 is one of parts functioning as "application server" for the Web server 713 and can be implemented by utilizing a technique of, for example, server Side Java (registered trademark) or CGI.

The GUI creation section 714 receiving the above request starts the snapshot control section 715 (see FIG. 14) in order to collect data necessary for creating the HTML file and transmits to the snapshot control section 715 a request for commanding it to transmit necessary data (S1070).

The snapshot control section 715 is one of parts functioning as "application server" for the Web server 713 as described above. The snapshot control section 715 receiving the above request first examines LU's constituting the VLU "FS1". This can be accomplished through the following procedures.

Firstly, the snapshot control sectin 715 transmits to a volume manager 707 (see FIG. 14) a request for commanding it to inform names of LU's constituting the VLU "FS1" (also termed DevName) (S1080).

The volume manager 707 receiving the above request examines the LU names constituting the VLU "FS1" by consulting the virtual logical volume management table 900 (see FIG. 11) (S1090). According to the table 900 shown in FIG. 11, it will be seen that the LU's constituting the VLU "FS1" are "LU0" and "LU1". After ending the examination, the volume manager 707 informs the snapshot control section 715 of the examined LU names (S1100).

From the notice from the volume manager 707, the snapshot control section 715 recognizes that the LU's constituting the VLU "FS 1" are LU0 and LU1 (S1110).

Next, the snapshot control section 715 examines which LU's can be made to be correspondent with the LU0 and LU1 constituting the VLU "FS1". In order that data of a particular LU (copy source LU) is copied to a different LU (copy destination LU), the copy source LU and the copy destination LU must have the "same construction". In other words, parameters (described previously; for example, emulation type and capacity) of the copy source LU must coincide with those of the copy destination LU. Accordingly, the snapshot control section 715 searches LU's having "the same construction" as the LU0 and LU1 and being in disuse. This can be done through the following procedures.

Firstly, the snapshot control section 715 transmits to the RAID manager a request for commanding it to send an "empty LU list" describing LU's having the "same construction" as the LU0 and LU1 and being in disuse (S1120).

The RAID manager 708 receiving the above request transfers it to the RAID control section 740 of DKA 140 (S1130).

The RAID control section 740 receiving this command consults the LU management table 800 (see FIG. 10) to examine, in respect of the individual LU0 and LU1, LU's which have the same emulation type and capacity as the LU0 and LU1 and for which "0" is inputted to the use flag 860 to indicate disuse (S1140). According to the LU management table 800, it will be seen that LU2 to LU8 meet the above conditions in respect of the LU0 and LU1. (In this example, these LU2 to LU8 correspond to "setting value candidates" or "copy destination memory volume candidates"). After ending the examination, the RAID control section 740 prepares an empty LU list 1400 (S1150).

An example of empty LU list 1400 is shown in FIG. 18. Described in an "object LU name" column 1410 are names of "LU0" and "LU1" representing LU's constituting the VLU "FS1" (that is, LU's having data to be copied). Described in a "corresponding empty LU" column 1420 are names of "LU2" to "LU8" representing LU's which are able to be correspondent with the individual LU0 and LU1 and are in disuse. The RAID control section 740 transmits this empty LU list 1400 to the RAID manager 708 (S1160 in FIG. 19).

Receiving the empty LU list 1400, the RAID manager 708 transfers the empty LU list 1400 to the snapshot control section 715 (S1170).

Next, the snapshot control section 715 transmits to the default candidate control section 716 the received empty LU list 1400 and a request for commanding that one of the LU2 to LU8 described in the "corresponding empty LU" column 1420 should be determined as a default of a copy destination LU candidate of the LU0 or LU1 (S1180).

Figure 20:
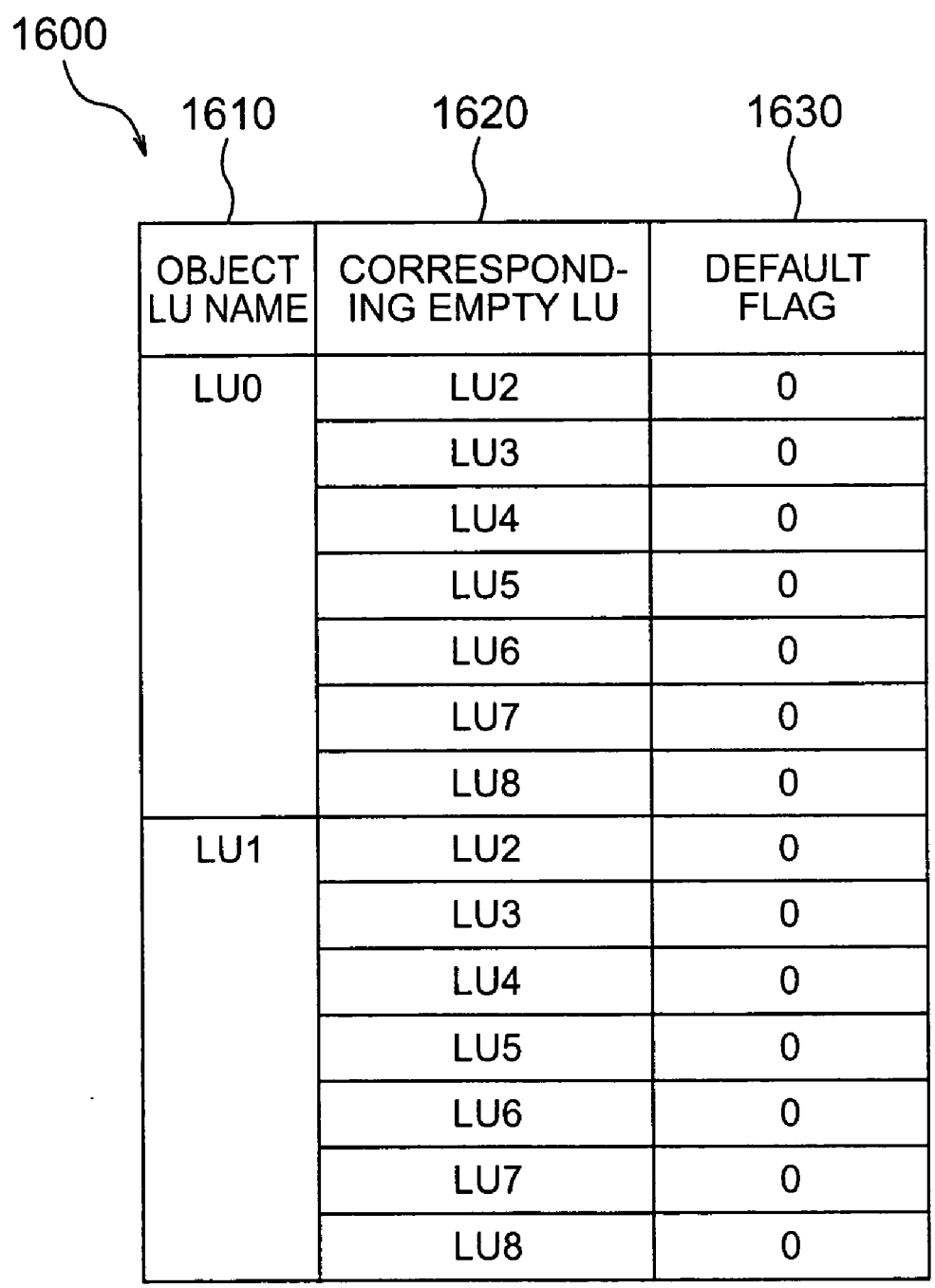
FIG. 20 shows an example of a default LU list according to another embodiment of the invention.

In the default candidate control section 716, a "default LU list" 1600 is prepared on the basis of the received empty LU list 1400 and the request (S1190). An example of the default LU list 1600 is shown in FIG. 20. To describe the S1190 in greater detail, the default candidate control section 716 adds a "default flag" column 1630 to the empty LU list 1400 to provide the default LU list 1600. Accordingly, the default LU list 1600 has an "object LU name" column 1610 and a "corresponding empty LU" column 1620 similarly to the empty LU list 1400 and in addition thereto, the "default flag" column 1630 indicating whether a particular LU is determined as a default of a copy destination LU candidate. At the beginning of preparation of the default LU list 1600, any of LU2 to LU8 described in the "corresponding empty LU" column 1620 is not determined as a default. Accordingly, "0" is described at all fields in this column 1630 (see FIG. 20). For example, this default LU list 1600 may be prepared in the NVRAM 115 or memory 113 of CHN 110 (see FIG. 9A), in the shared memory 120 or cache memory 130 of memory device controller 100 (see FIG. 5) or in the system LU (not shown) of memory device 300.

Figure 23:
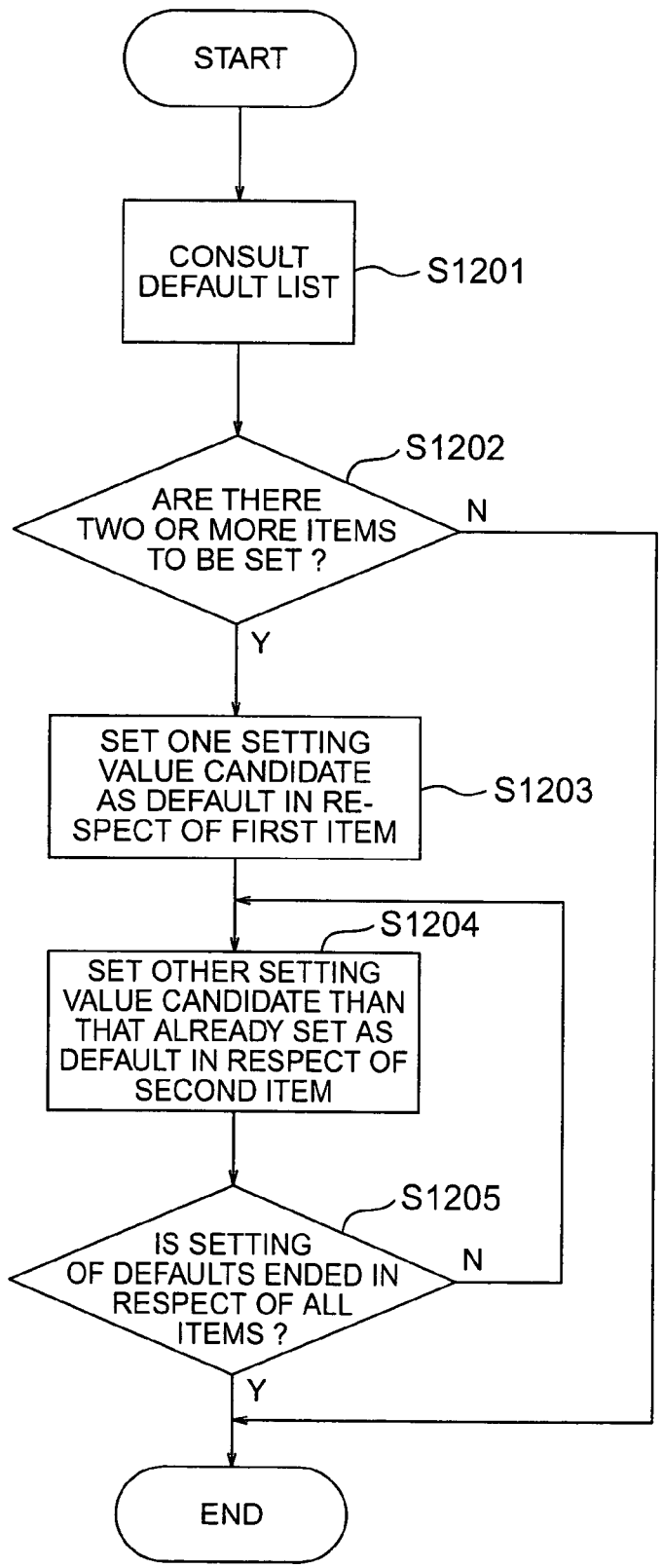
FIG. 23 is a flowchart showing part of an example of a process for determining defaults of setting value candidates according to still another embodiment of the invention.

Next, the default candidate control section 716 sets, in respect of LU0 first appearing in the "object LU name" column 1610, any of the LU's described in the "corresponding empty LU" column 1620 (namely, "LU 2 to LU8") as a default of a copy destination LU candidate (S1200). This S1200 will be described in greater detail by making reference to FIG. 23. Firstly, the default candidate control section 716 consults the default LU list 1600 (S1201). Then, it recognizes that two or more LU's to be set are present in the "object LU name" column 1610 (S1202:Y). At present, "0" is described at all fields of the "default flag" column 1630 in default LU list 1600. Accordingly, the default candidate control section 716 sets LU2 first appearing in the "default flag" column 1630 as a default of a copy destination LU candidate corresponding to LU0 (S1203). Then, as shown in FIG. 21, "1" is described in a corresponding field (namely, a field corresponding to LU2 on the LU0 side in the "default flag" column 1630).

Figure 22:
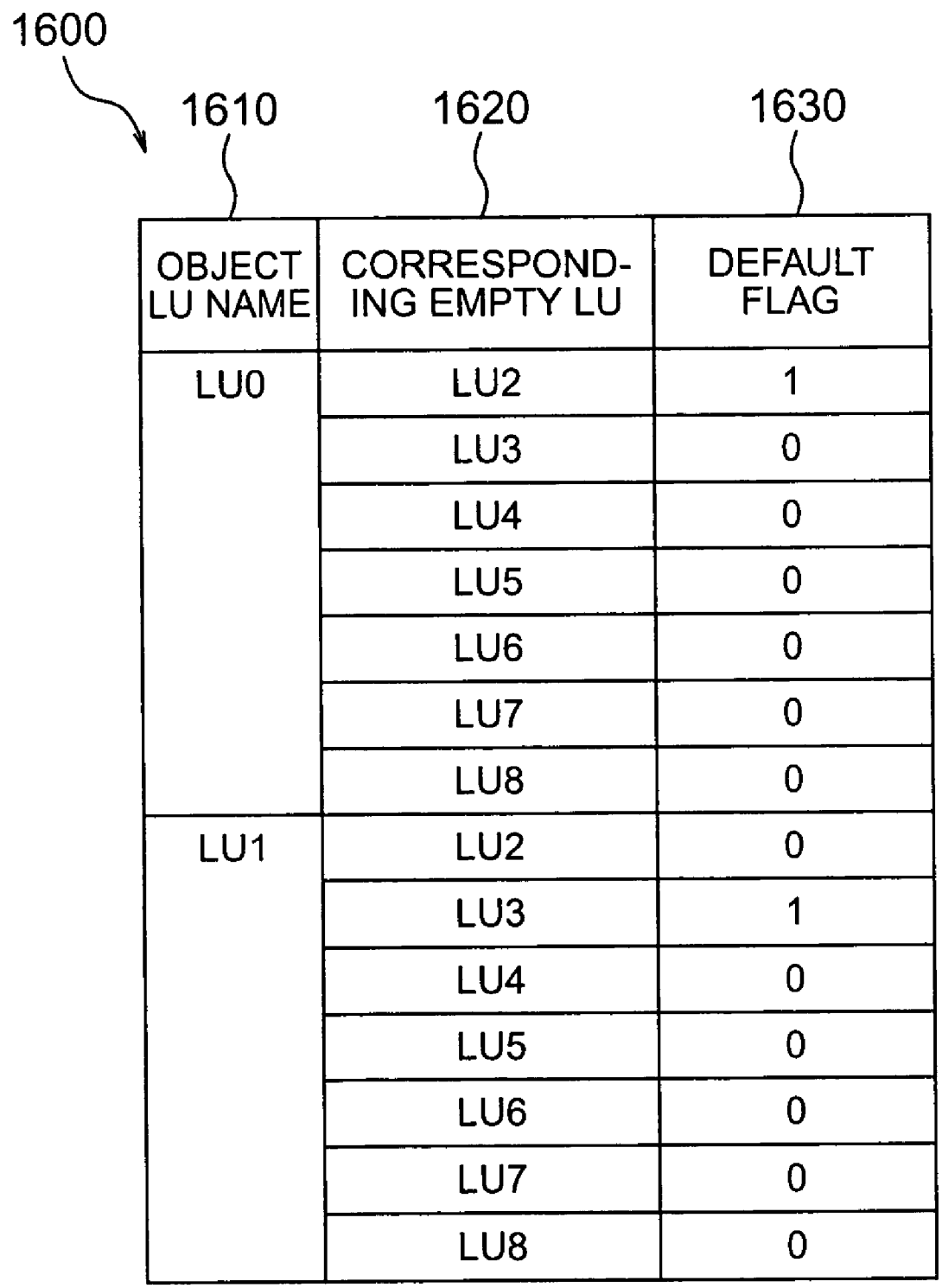
FIG. 22 shows an example of a default LU list according to still another embodiment of the invention.

Subsequently, the default candidate control section 716 determines, in respect of LU1 secondly appearing in the "object LU name" column 1610, any of LU's described in the "corresponding empty LU" column 1620 as a default (S1210). The S1210 will be described in greater detail by making reference to FIG. 23. By consulting the default LU list 1600, the default candidate control section 716 recognizes that "1" is described at the field corresponding to LU2 on the LU0 side in the "default flag" column 1630 (namely, LU2 is set as the default for LU0). Then, the default candidate control section 716 sets, as a default of a copy destination LU candidate of LU1, LU3 appearing next to LU2 in the "corresponding empty LU" column 1620 (S1204). Thus, as shown in FIG. 22, "1" is described in a corresponding field (namely, a filed corresponding to LU3 on the LU1 side in the "default flag" column 1630.

In case LU's to be set remain in the "object LU name" column 1610 (S1205:Y in FIG. 23), the S1204 is executed in respect of each of these LU's. In this example, no LU's to be set other than LU0 and LU1 are present (S1205:N) and therefore, the process of FIG. 23 ends.

The default candidate control section 716 transmits the prepared default LU list 1600 to the snapshot control section 715 (S1220).

By making reference to the received default LU list 1600, the snapshot control section 715 recognizes that LU2 and LU3 are set as defaults of copy destination candidates in respect of the LU0 and LU1, respectively (S1230). Subsequently, the snapshot control section 715 informs the GUI creation section 714 that (1) LU's constituting the VLU "FS1" are LU0 and LU1, (2) copy destination LU candidates which are able to be correspondent with the LU0 and LU1 and are in disuse are LU2 to LU8 and (3) the LU2 and LU3 are set as defaults of copy destination LU candidates in respect of the LU0 and LU1, respectively (S1240).

On the basis of the received information of (1) to (3) as above, the GUI creation section 714 creates a HTML file to be returned to the Web browser (namely, "picture data") (S1250). Then, it transmits the created HTML file to the Web server 713 (S1260).

The Web server 713 receives the created HTML file and transmits it, as a HTTP response, to the Web browser of information processing apparatus 200 (S1270).

Figure 24:
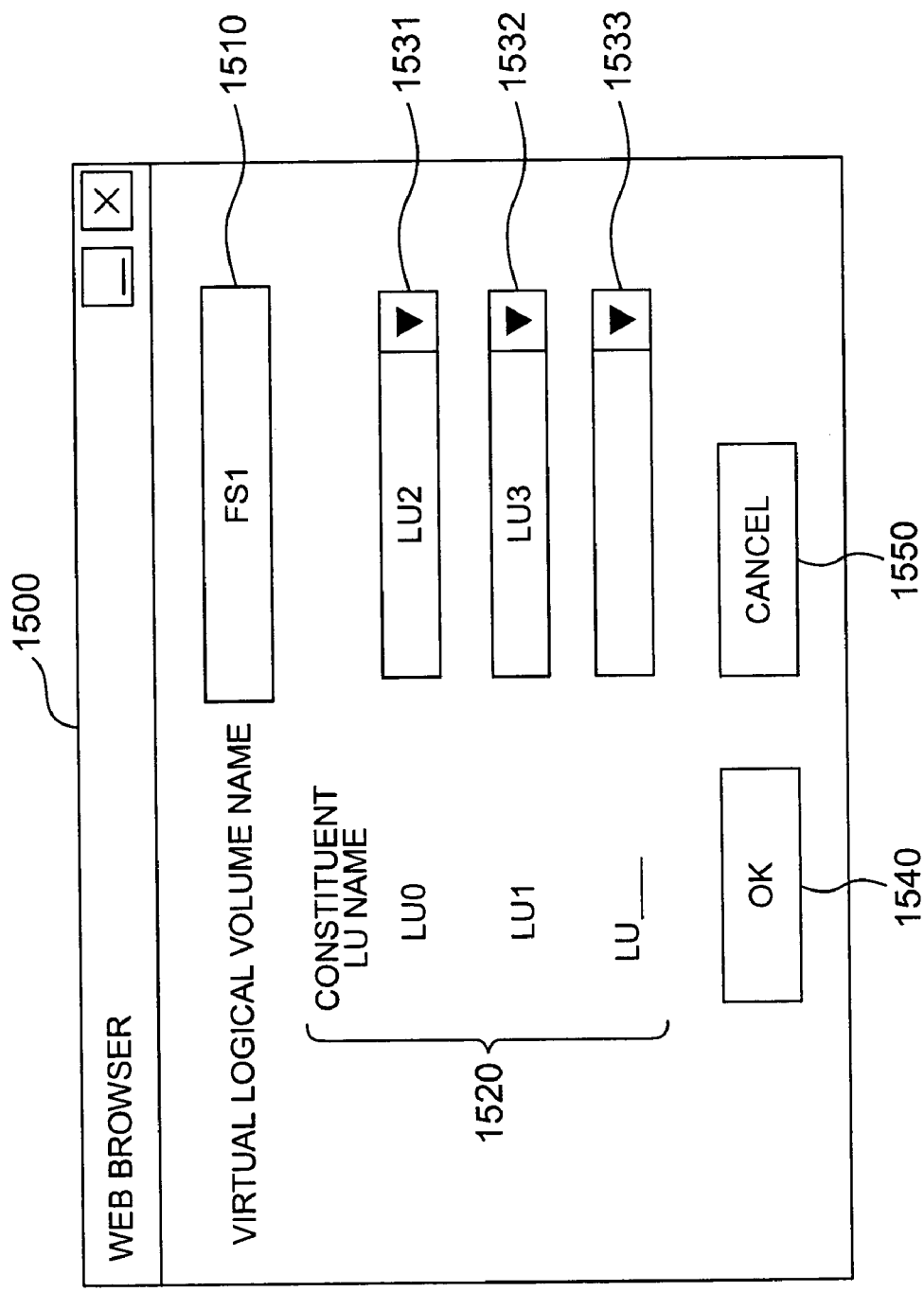
FIG. 24 is a diagram showing an example of a picture displayed on the display unit according to still another embodiment of the invention.

On the basis of the received HTML file, the Web browser of information processing apparatus 200 causes the display unit 204 of information processing apparatus 200 to display a system management console picture 1500, for example, as shown in FIG. 24 (S1280). In the example of the picture 1500 shown in FIG. 24, "LU0" and "LU1" representing names of the LU's constituting the VLU "FS1" are displayed at a part 1520. In an input column 1531, "LU2" is displayed as the default of copy destination LU candidate in respect of the LU0. In an input column 1532, "LU3" is displayed as the default of copy destination LU candidate in respect of the LU1.

According to the previously-described picture data creation process and the system management console picture 1500 displayed as the result of the process, not only LU's constituting the virtual logical volume are displayed but also names of different copy destination LU candidates are displayed as defaults without overlap in respect of the individual LU's (namely, copy source LU's serving as sources of copy of data). With the construction as above, the user and the system manager can make the correspondence between the individual copy source LU's and the different copy destination LU's without overlap by merely pressing the "OK" button 1540 on the picture 1500 without resort to any further operation applied to the input columns 1531 to 1533. In other words, the user and system manager need not make the correspondence between the individual copy source LU's and the copy destination LU's one by one by operating the input columns 1531 to 1533. Accordingly, with this construction, the user and system manager can be freed from labor and time to a great extent and troublesomeness of work can be mitigated.

To add to the above, after the user or system manager presses the "OK" button on the picture 1500 to settle the correspondence between the copy source LU and the copy destination LU (after the S1280 in FIG. 19), information concerning the settled correspondence is transmitted from the information processing apparatus 200 to the storage system 600. The information is then transferred to the replication management program 760 of DKA 140 in the memory device controller 100 and the remote copy control program 750. Thus, the programs 750 and 760 execute the replication management, remote copy and replication in respect of the copy source LU/copy destination LU.

APPLIED EXAMPLE 1

Figure 25:
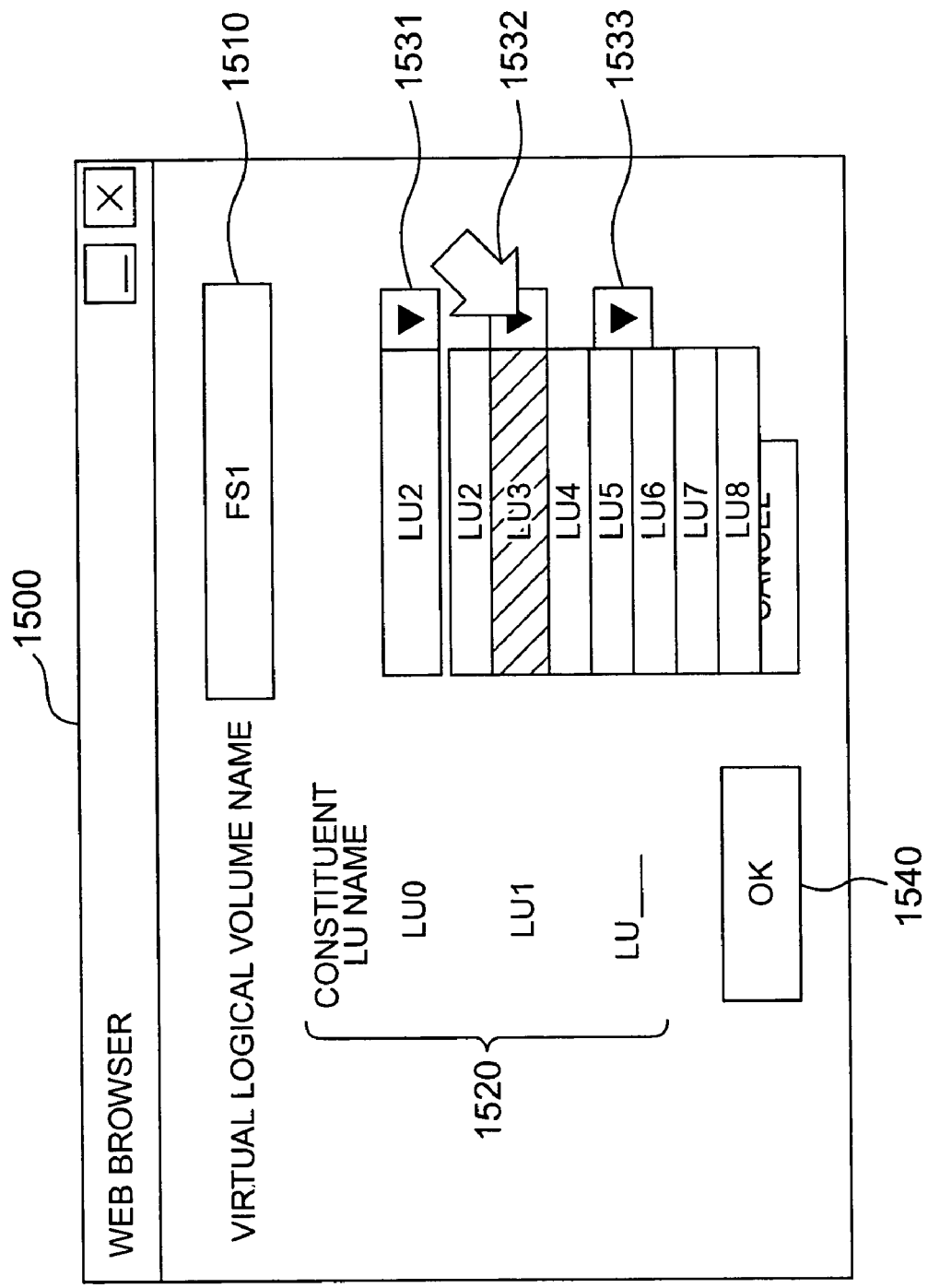
FIG. 25 is a diagram showing another example of a picture displayed on the display unit according to an embodiment of the invention.

When the user or system manager operates copy destination LU candidates displayed as defaults in the input columns 1531 to 1533, other copy destination LU candidates (LU2 to LU8) which can be correspondent with LU0 and LU1 may be displayed, for example, in a pull-down menu format as shown in FIG. 25.

With this construction, when the user or system manager desires to select setting value candidates other than the setting value candidate displayed as the default, different setting value candidates (in the example of FIG. 25, "LU2" and "LU4" to "LU8" displayed in the input column 1532 corresponding to LU1) can be displayed. Through this, the user or system manger can browse the different setting value candidates to select another setting value candidate therefrom with ease.

APPLIED EXAMPLE 2

Figure 26:
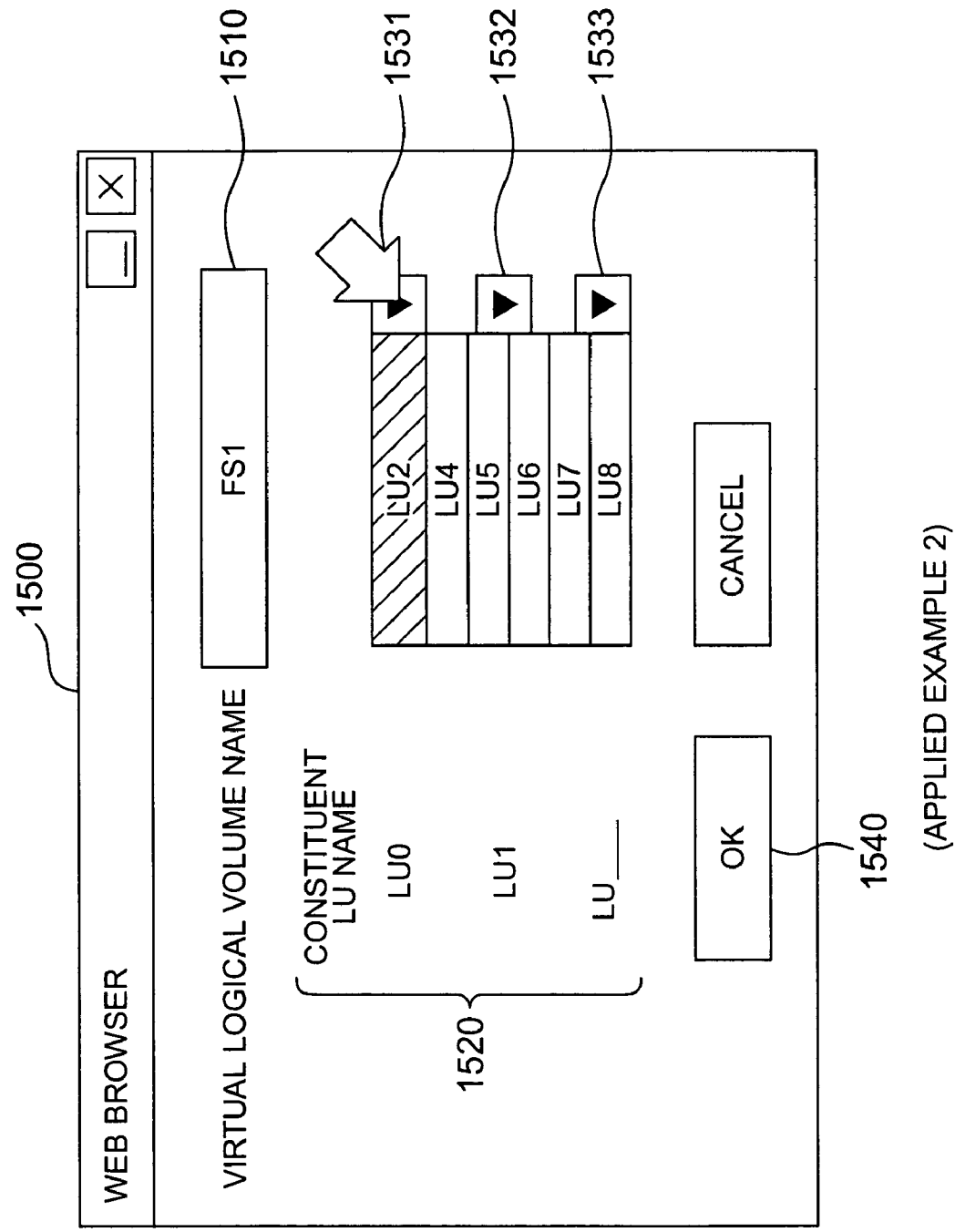
FIG. 26 is a diagram showing still another example of a picture displayed on the display unit according to still another embodiment of the invention.

As shown in FIG. 26, when the user or system manger operates, for example, the copy destination LU candidate "LU2" displayed as the default in the input column 1531, "LU4" to "LU8" other than the "LU3" displayed in the input column 1532 of LU1 may be displayed in, for example, a pull-down menu format.

With this construction, when the user or system manager wants to select a setting value candidate other than the setting value candidate displayed as the default (for example, in FIG. 26, the copy destination LU candidate "LU2" which is correspondent with the copy source LU "LU0"), different setting value candidates (namely, "LU4" to "LU8") excepting the setting value candidate which has already been made to be correspondent with another item (the copy destination LU "LU3" which is correspondent with the copy source LU "LU1") can be displayed. Through this, a situation can be avoided in which the user or system manager erroneously selects setting value candidates which have already been correspondent with a different item.

APPLIED EXAMPLE 3

Figure 27:
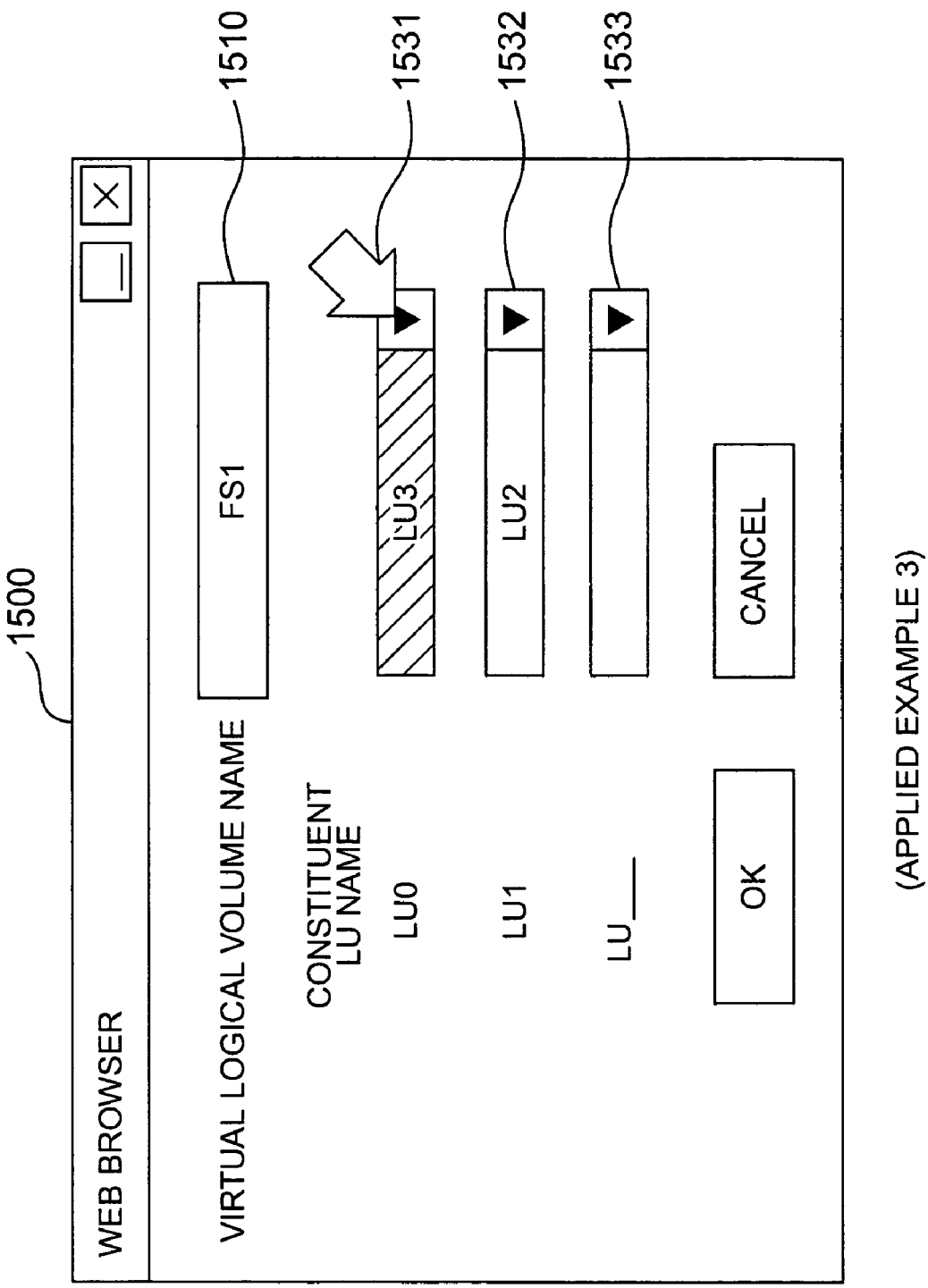
FIG. 27 is a diagram showing still another example of a picture displayed on the display unit according to still another embodiment of the invention.

As shown in FIG. 27, when the input column 1531 of LU0 is operated and "LU2" displayed as the default is changed to "LU3", the copy destination LU candidate displayed in the input column 1532 of LU1 may also be changed to an LU (in the depicted example, "LU2") other than the "LU3" resulting from the changed in the input column 1531.

With this construction, when one input column is operated to change the setting value candidate displayed there, the correspondence between the individual copy source LU's and different copy destination LU candidates can be made without overlap by merely pressing the "OK" button 1540 on the picture 1500 without resort to operations applied even to different input columns. Accordingly, troublesomeness of work by the user or system manager can further be mitigated.

APPLIED EXAMPLE 4

Parameters may be allotted to each setting value candidate and on the basis of the parameters, a setting value to be displayed as a default in each input column may be determined. A description will be given below by making reference to a concrete example.

Figure 28:
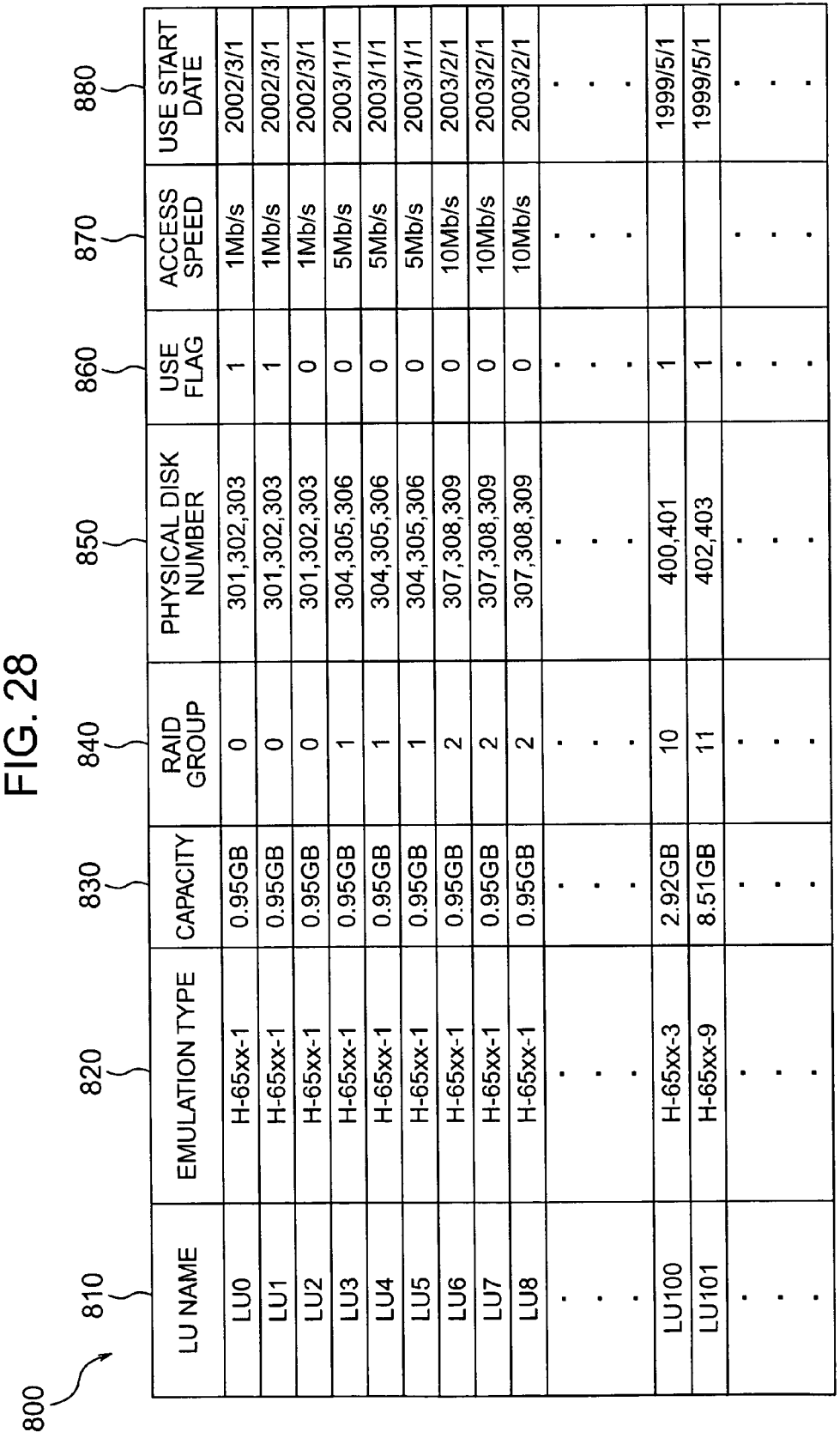
FIG. 28 shows another example of the LU management table according to an embodiment of the invention.
Figure 29:
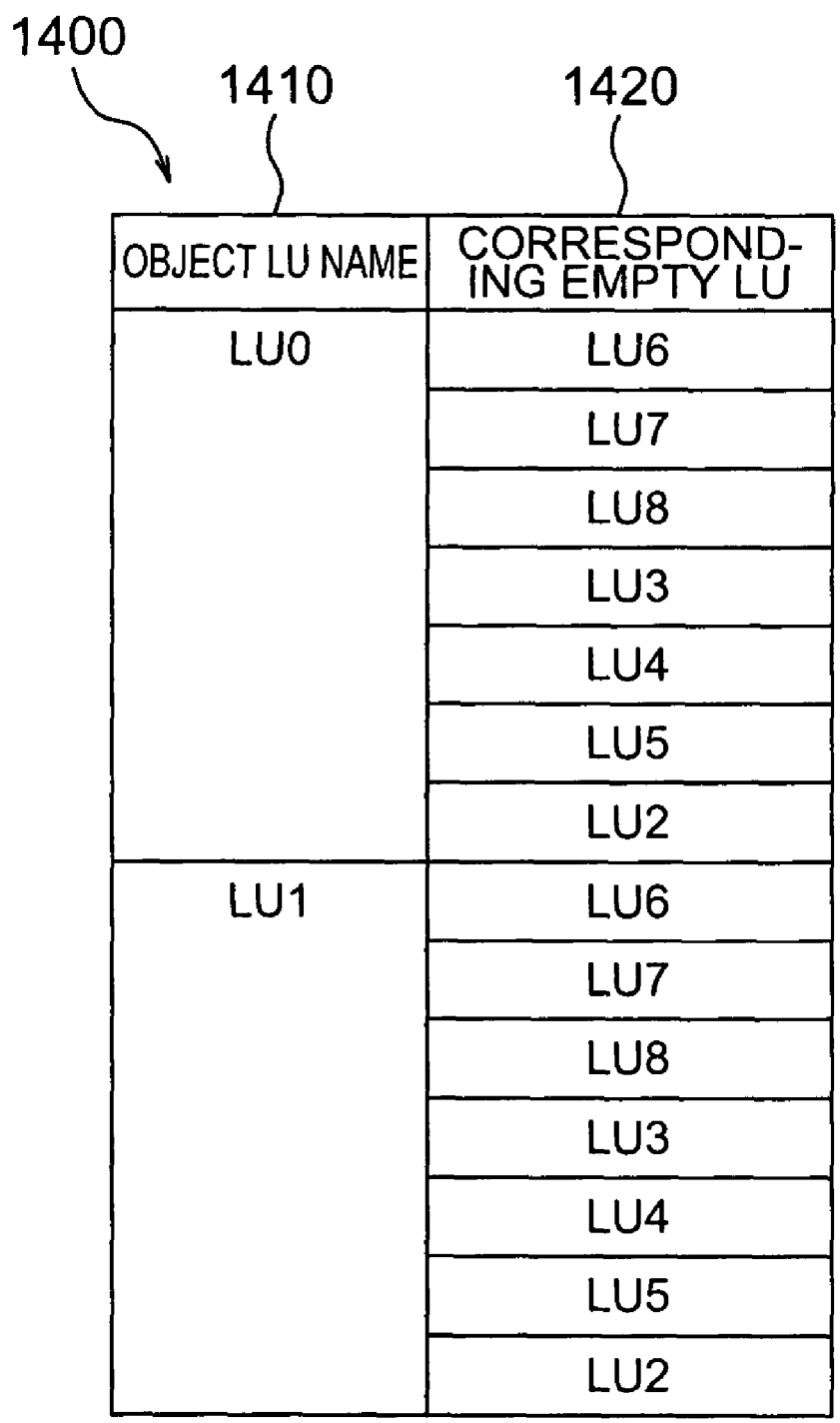
FIG. 29 shows another example of the empty LU list according to an embodiment of the invention.

In an LU management table 800 as shown in FIG. 28, parameters other than those shown in FIG. 10, including, for example, an "access speed" 870 indicative of an input/output speed to/from each LU and a "use start date" 880 indicative of a time that each LU begins to be used, are further managed. Then, in preparing an empty LU list 1400 by examining the LU management table 800 in the S1140 and S1150 in FIG. 15, the RAID control section 740 consults also these parameters 870 and 880 in the LU management table 800 to prepare, for example, an empty LU list 1400 as shown in FIG. 29. In other words, the RAID control section 740 consults the LU management table 800 of FIG. 28 to prepare the empty LU list 1400 in such a manner that LU6 to LU8 having good performance (namely, "access speed" is high and "use start date" is recent) appear in high rank and LU3 to LU5 having performance second to the performance of LU6 to LU8 succeed them.

Figure 30:
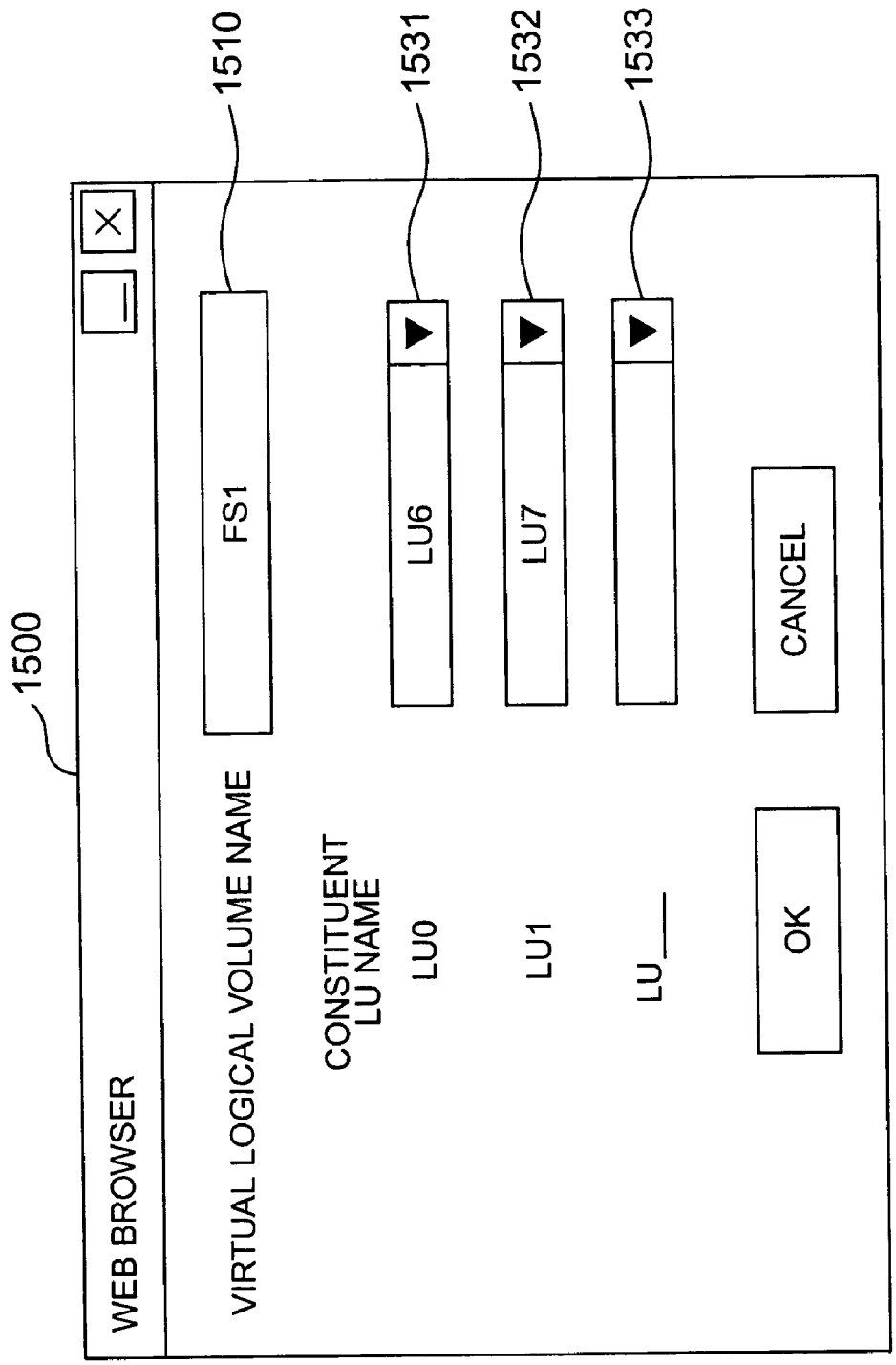
FIG. 30 is a diagram showing still another example of a picture displayed on the display unit according to still another embodiment of the invention.

In the S1190 to S1210, the default candidate control section 716 determines, in order of excellence of performance, copy destination LU candidates which serve as defaults. An example of a picture displayed by way of such a procedure as above is shown in FIG. 30. In input columns 1531 and 1532, "LU6" and "LU7" of good performance are displayed as defaults.

With this construction, setting value candidates having excellent characteristics can preferentially be displayed as defaults.

In addition to the "access speed" and "use start date", a "maker" of a physical disk constituting an LU and a "price" of the physical disk are conceivable as the aforementioned parameters. Needless to say, parameters other than the above can be employed.

Further, when there are a plurality of parameters, such construction may be adopted in which the user or system manager can select which parameter is to be consulted preferentially. For example, the user or system manager is allowed to select the above parameter on the picture. As exemplified in FIG. 31, an input column 1534 for selection of parameter may be provided to enable the user or system manager to select a parameter to be used preferentially.

Assumptively, the user or the like selects the "access speed" as a parameter to be used preferentially. In this case, out of an LU having a high "access speed" and an LU having a recent "use start date", the UL of high "access speed" is preferentially displayed in the input columns 1531 and 1532.

APPLIED EXAMPLE 5

The correspondence may be made in such a way that an RAID group to which copy source LU's belong differs from an RAID group to which copy destination LU candidates belong.

Figure 15:
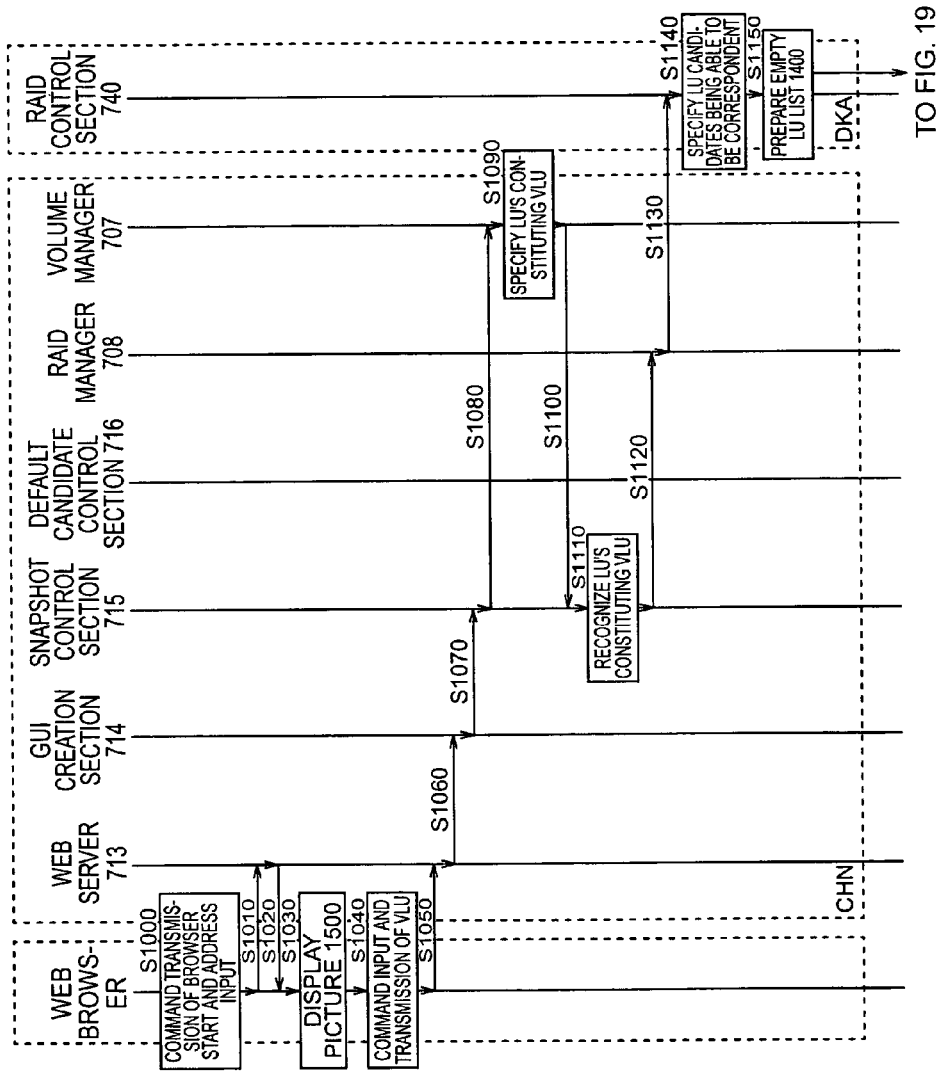
FIG. 15 is a flowchart showing part of an example of a process for determining defaults of setting value candidates according to an embodiment of the invention.

For example, when preparing a LU list 1400 in the S1140 and S1150 in FIG. 15 by examining the LU management table 800, the RAID control section 740 may search such LU's that (1) they have the same emulation type and capacity as those of copy source LU0 and LU1, (2) their use flags 860 are inputted with "0" (namely, in disuse) and (3) they belong to a RAID group different from that for the copy source LU0 and LU1. In this case, the RAID control section 740 may select, as correspondent copy destination LU candidates, "LU3" to "LU8" belonging to a different RAID group from that for the copy source LU's of "LU0" and "LU1".

Figure 19:
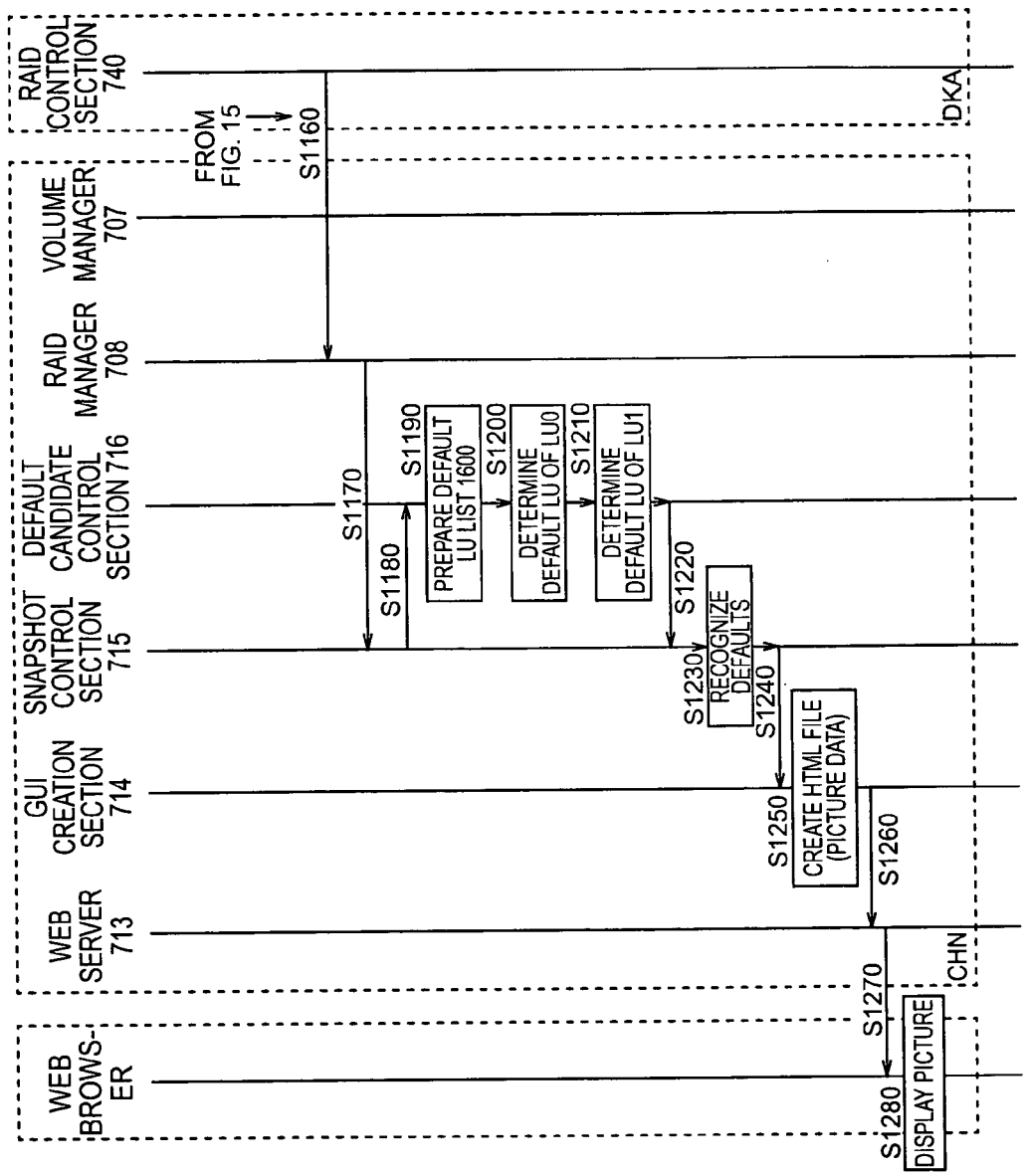
FIG. 19 is a flowchart showing part of an example of a process for determining defaults of setting value candidates according to another embodiment of the invention.
Figure 32:
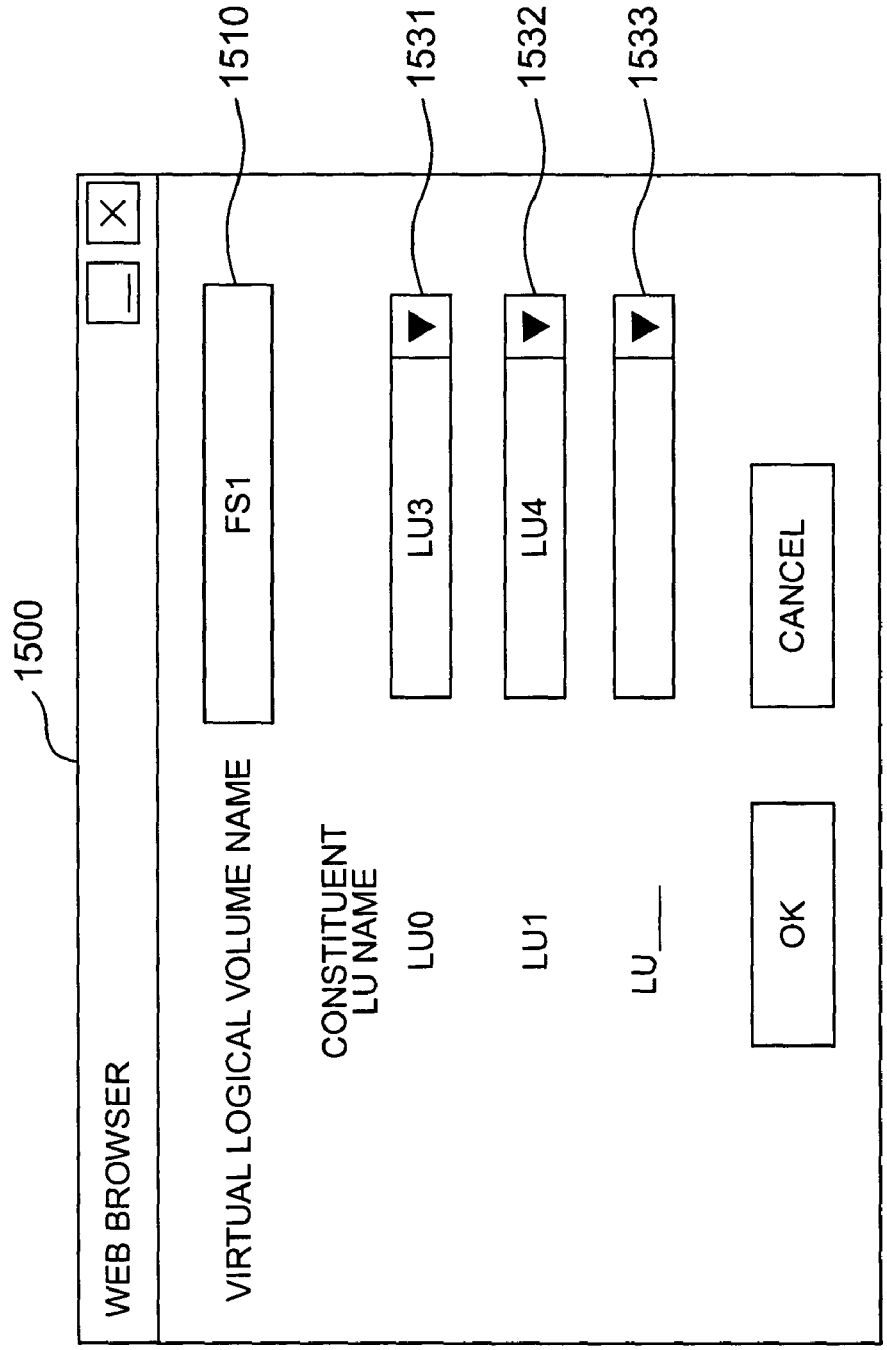
FIG. 32 is a diagram showing still another example of a picture displayed on the display unit according to still another embodiment of the invention.

In the S1190 to S1210 in FIG. 19, the default candidate control section 716 determines copy destination LU candidates serving as defaults from the "LU3" to "LU8". An example of a picture displayed by way of such a procedure as above is shown in FIG. 32. In input columns 1531 and 1532, "LU3" and "LU4" belonging to a different RAID group from that for the "LU0" and "LU1" are displayed as defaults.

With this construction, data of copy source LU's can be copied to copy destination LU's belonging to a different RAID group from that for the copy source LU's.

Essentially, data is copied or a backup of an LU is prepared in the storage system by taking into account data maintainability/anti-fault properties. According to this example, the copy source LU's and the copy destination LU's belong to mutually different RAID groups and therefore, even in the event that the RAID group to which the copy source LU's belong becomes faulty, data can be maintained in the copy destination LU's without fail. Accordingly, the data maintainability/anti-fault properties of the whole of the storage system can be improved further.

Figure 31:
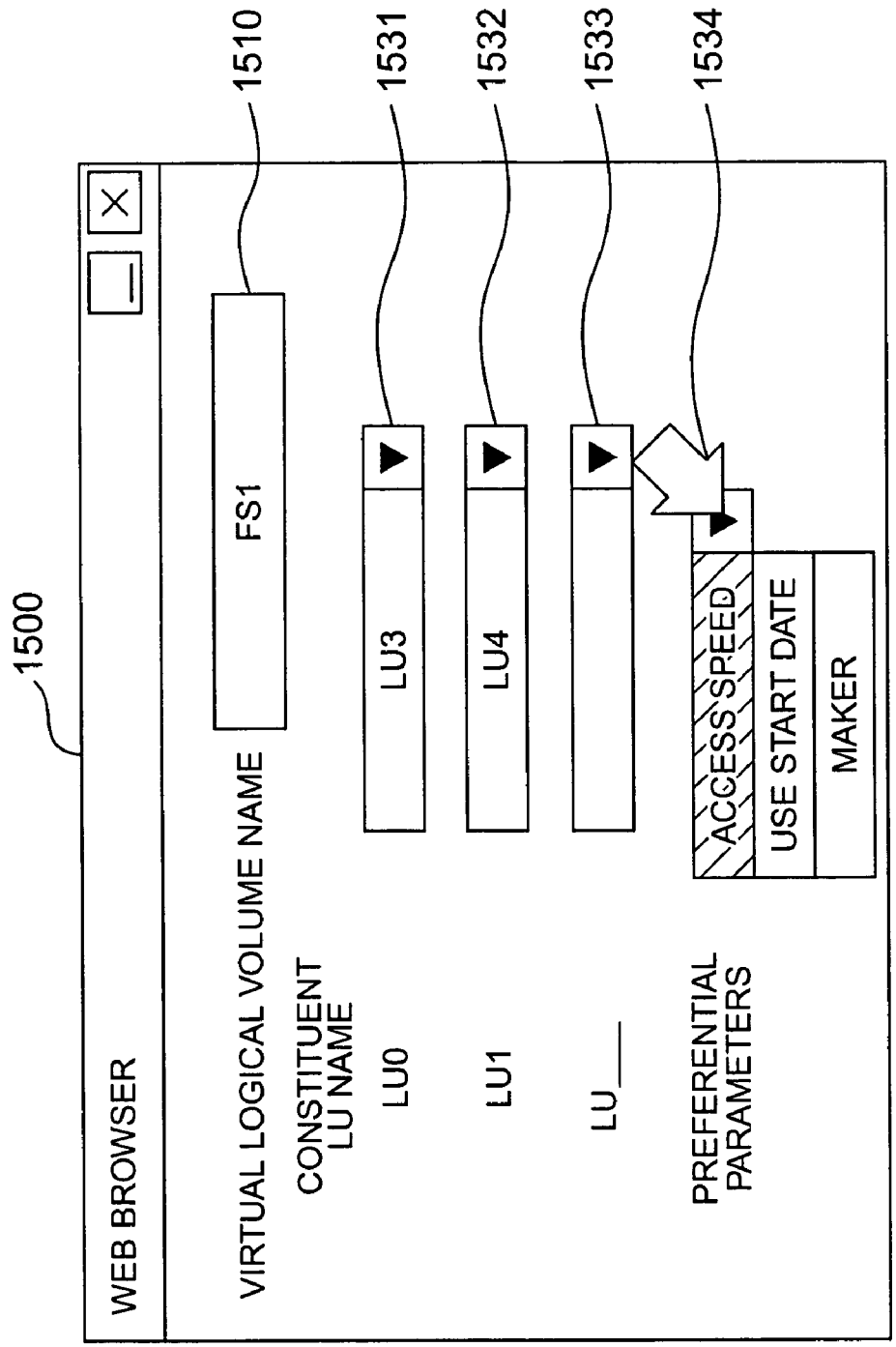
FIG. 31 is a diagram showing still another example of a picture displayed on the display unit according to still another embodiment of the invention.

To add, by providing such an item "RAID group distribution" as one item in the input column 1534 in FIG. 31, the user or system manager is also allowed to select a method for selection of copy destination LU's as in the applied example 5.

In this case, too, the aforementioned applied example 4 can be applied. More particularly, (1) by determining copy destination LU's in such a way that the copy source LU and the copy destination LU belong to different RAID groups and (2) on the basis of parameters attendant on LU's determined as copy destination LU candidates, copy destination LU candidates to be displayed as defaults at individual fields of the input column may be determined.

A description will be given by using the aforementioned example. Out of "LU3" to "LU8" belonging to a different RAID group from that for copy source LU's "LU0" and "LU1", a LU to be displayed further preferentially is determined. For example, reference is made to the LU management table 800 as shown in FIG. 28 so as to select and determine, out of "LU3" to "LU8", a LU of good performance (for example, "access speed" is high and "use start date" is recent) as a copy destination LU candidate of default. In this example, "LU6" and "LU7" belonging to a different RAID group from that for the copy source LU's and having good performance will be displayed as defaults in the input columns 1531 and 1532, as shown in FIG. 30.

In connection with the above, the user or system manger can make a choice by using a selection picture as shown in FIG. 31. More particularly, an additional input column 2 is provided laterally of, for example, the input column 1534. In the input column 2, too, parameters similar to those in the input column 1534 are provided. Firstly, the user selects, in the input column 1534, the aforementioned item "RAID group distribution" which is a parameter for distributing the RAID group of the copy destination LU's. Thereafter, in the input column 2, the "access speed", for instance, is selected. In response thereto, the default control section first follows the "RAID group distribution" selected in the input column 1534 to determine copy destination LU's in such a way that copy source LU's and copy destination LU's belong to different RAID groups. Further, when there are a plurality of determined copy destination LU's, the control section can preferentially display, in connection with the plurality of copy destination LU's, a LU having a high access speed representing a parameter selected in the input column 2.

APPLIED EXAMPLE 6

By making application to the aforementioned applied example 5, the correspondence can be made in such a way that a RAID group to which copy source LU's belong and RAID groups to which copy destination LU candidates being correspondent with the individual copy source LU's belong are all different from each other. In the case of this example, the correspondence may be made in such a manner that LU0 and LU1 representing copy source LU's (both belonging to a RAID group 0), a copy destination LU candidate to be correspondent with the LU0 and a copy destination LU candidate to be correspondent with the LU1 all belong to different RAID groups.

To realize this, the RAID control section 740, for instance, consults the LU management table 800 in the S1140 to prepare, in the S1150, an empty LU list 1400 (see FIG. 33) in which copy destination LU candidates belonging to different RAID groups are allotted to the LU0 and LU1, respectively.

With the construction as above, the data maintainability/anti-fault properties of the whole of the storage system can be improved further.

In this case, too, the aforementioned applied example 4 can be applied.

OTHERS

Although the present invention has bee described by way of example of preferred embodiments thereof, it should be understood that the invention can be changed, substituted or altered/modified in various ways without departing from the spirit and the scope of the invention defined in the appended claims.

According to the present invention, the GUI can be provided which can alleviate troublesomeness of work by setter/operator engaged in setting of the computer.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A picture data creation method for creating, by means of a computer, picture data necessary to display on a display unit a picture in which two or more items and input columns made to be correspondent with the individual items are provided, wherein the input columns are provided for selecting setting values correspondent with the items from a plurality of setting value candidates which can be correspondent with the items and inputting the selected setting values, and the computer has a step of creating picture data necessary for causing the display unit to display a picture in which the mutually different setting value candidates are displayed as defaults in the individual input columns;

wherein the computer is a memory device controller, the memory device controller is communicatively connected to a plurality of memory volumes for storing data so as to manage/control the memory volumes, the memory device controller is communicatively connected to an information processing apparatus, and the information processing apparatus unit includes the display unit, wherein the two or more items are identifiers of two or more copy source memory volumes, the copy source memory volume is a memory volume serving as a copy source of data, the setting value is an identifier of a copy destination memory volume, the copy destination memory volume is a memory volume serving as a copy destination of the data of the copy source memory volume, the setting value candidate is a copy destination memory volume candidate, and the copy destination memory volume candidate is a memory volume having the same construction as the copy source memory volume and being able to be a copy destination of the data of the copy source memory volume, and wherein when the correspondence is made between the individual two or more copy source memory volumes and the copy destination memory volumes, the computer creates, in the step of creating the picture data, picture data necessary for causing the display unit of the information processing apparatus to display a picture in which mutually different identifiers of the copy destination memory volume candidates are displayed as defaults in the individual input columns.

2. A picture data creation method according to claim 1, wherein the picture data includes data for causing, in respect of the input column, setting value candidates other than a setting value candidate displayed as the default in the input column to be displayed on the display unit and causing an operator to select one setting value candidate from the displayed setting value candidates, thereby making it possible to change the setting value candidate displayed as the default.

3. A picture data creation method according to claim 1, wherein the picture data includes data for causing, in respect of the input column, setting value candidates other than the setting value candidates displayed as the defaults in the individual input columns to be displayed and causing an operator to select one setting value candidate from the displayed setting value candidates, thereby making it possible to change the setting value candidate displayed as the default.

4. A picture data creation method according to claim 1, wherein the computer has a step of creating, when a setting value candidate displayed as a default in a particular input column is changed, picture data necessary for causing the display unit to display a picture in which the changed setting value candidate displayed in the input column differs from a setting value candidate displayed as a default in a different input column.

5. A picture data creation method according to claim 1, wherein parameters are made to be correspondent with the individual setting value candidates and in the step of creating the picture data, the setting value candidates to be displayed as defaults in the individual input columns are determined on the basis of the parameters.

6. A picture data creation method according to claim 1, wherein the two or more memory volumes constitute a virtual logical volume for providing a single virtual and logical storage area and the method further executes, before the step of creating the picture data, a step of causing, when a virtual logical volume representing a copy source of data is designated, the memory device controller to specify memory volumes constituting the designated virtual logical volume as copy source memory volumes, a step of causing the memory device controller to specify copy destination memory volume candidates in respect of the individual specified copy source memory volumes and a step of causing the memory device controller to determine, in respect of individual input columns made to be correspondent with identifiers of the specified copy source memory volumes, a single copy destination memory volume candidate whose identifier is displayed as a default from the specified copy destination memory volume candidates.

7. A picture data creation method according to claim 1, wherein the memory device controller makes use of the memory volumes by dividing them into a plurality of RAID groups and in the step of creating the picture data, creates picture data necessary for causing the display unit of the information processing apparatus to display a picture in which an identifier of a copy destination memory volume candidate being different from a copy destination memory volume candidate whose identifier is displayed as a default in a different input column and being included in a RAID group different from a RAID group including the copy source memory volumes is displayed as a default.

8. A picture data creation method according to claim 1, wherein the memory device controller makes use of the memory volumes by dividing them into a plurality of RAID groups and in the step of creating the picture data, creates picture data necessary for causing the display unit of the information processing apparatus to display a picture in which an identifier of a copy destination memory volume candidate being different from a copy destination memory volume candidate whose identifier is displayed as a default in a different input column and being included in a RAID group which is different from a RAID group including the copy source memory volumes and is also different from a RAID group including the copy destination memory volume candidate whose identifier is displayed as the default in the different input column.

9. A computer for creating picture data necessary to display on a display unit a picture in which two or more items and input columns correspondent with the individual items are provided, wherein the input columns are provided for selecting setting values correspondent with the items from a plurality of setting value candidates which can be correspondent with the items and inputting the selected setting values, and wherein the computer creates picture data necessary for causing the display unit to display a picture in which the mutually different setting value candidates are displayed as defaults in the individual input columns;

wherein the computer is a memory device controller, the memory device controller is connected communicatively to a plurality of memory volumes for storing data to manage/control the memory volumes, the memory device controller is connected communicatively to an information processing apparatus, and the information processing apparatus includes the display unit, wherein the two or more items are identifiers of two or more copy source memory volumes, the copy source memory volume is a memory volume serving as a copy source of data, the setting value is an identifier of a copy destination memory volume, the copy destination memory volume is a memory volume serving a copy destination of the data of the copy source memory volume, the setting value candidate is a copy destination memory volume candidate, and the copy destination memory volume candidate is a memory volume having the same construction as the copy source memory volume and being able to be a copy destination of the data of the copy source memory volume, and wherein when the picture data is created, the computer creates picture data necessary for causing the display unit of the information processing apparatus to display a picture in which mutually different identifiers of the copy destination memory volume candidates are displayed as defaults in the individual input columns.

10. A computer for creating picture data necessary to display on a display unit a picture in which two or more items and input columns correspondent with the individual items are provided, wherein the input columns are provided for selecting setting values correspondent with the items from a plurality of setting value candidates which can be correspondent with the items and inputting the selected setting values, and wherein the computer creates picture data necessary for causing the display unit to display a picture in which the mutually different setting value candidates are displayed as defaults in the individual input columns;

wherein the computer is a storage system, the storage system includes a plurality memory volumes for storing data and a memory device controller connected communicatively to the plurality of memory volumes to manage/control the memory volumes, the memory device controller is connected communicatively to an information processing apparatus and the information processing apparatus includes the display unit, wherein the two or more items are identifiers of two or more copy source memory volumes, the copy source memory volume is a memory volume serving as a copy source of data, the setting value is an identifier of a copy destination memory volume, the copy destination memory volume is a memory volume serving as a copy destination of the data of the copy source memory volume, the setting value candidate is a copy destination memory volume candidate and the copy destination memory volume is a memory volume having the same construction as the copy source memory volume and being able to be a copy destination of the data of the copy source memory volume, and wherein when the picture data is created, the memory device controller creates picture data necessary for causing the display unit of the information processing apparatus to display a picture in which mutually different identifiers of the copy destination memory volume candidates are displayed as defaults in the individual input columns.

11. A computer-readable storage medium having a program for causing a computer to implement a function of creating picture data necessary to display on a display unit a picture in which two or more items and input columns made to be correspondent with the individual items are provided, wherein the input columns are provided for selecting setting values correspondent with the items from a plurality of setting value candidates which can be correspondent with the items and inputting the selected setting values, and the program causes the computer to implement a function of creating picture data necessary for causing the display unit to display a picture in which the mutually different setting value candidates are displayed as defaults in the individual input columns;

wherein the computer is a memory device controller, the memory device controller is connected communicatively to a plurality of memory volumes for storing data so as to manage/control the memory volumes, the memory device controller is connected communicatively to an information processing apparatus and the information processing apparatus includes the display unit, wherein the two or more items are identifiers of two or more copy source memory volumes, the copy source memory volume is a memory volume serving as a copy source of data, the setting value is an identifier of a copy destination memory volume, the copy destination memory volume is a memory volume serving as a copy destination of the data of the copy source memory volume, the setting value candidate is a copy destination memory volume candidate and the copy destination memory volume candidate is a memory volume having the same construction as the copy source memory volume and being able to be a copy destination of the data of the copy source memory volume, and wherein when the picture data is created, the program causes the memory device controller to implement a function of creating picture data necessary for causing the display unit of the information processing apparatus to display a picture in which mutually different identifiers of the copy destination memory volume candidates are displayed as defaults in the individual input columns.

* * * * *